United States Patent [19]

Masui et al.

[11] Patent Number: 5,303,328
[45] Date of Patent: Apr. 12, 1994

[54] NEURAL NETWORK SYSTEM FOR DETERMINING OPTIMAL SOLUTION

[75] Inventors: Hironari Masui, Kawasaki; Ikuo Matsuba, Zama, both of Japan

[73] Assignee: Hitachi, Ltd., Tokyo, Japan

[21] Appl. No.: 782,097

[22] Filed: Oct. 24, 1991

[30] Foreign Application Priority Data

Oct. 24, 1990 [JP] Japan .................................. 2-284236

[51] Int. Cl.⁵ ............................................ G06F 15/18
[52] U.S. Cl. ........................................ 395/23; 395/11; 395/22
[58] Field of Search .................................. 395/23, 22

[56] References Cited

PUBLICATIONS

Hopfield et al., "Neural Computation of Decisions in Optimization Problems", Biological Cybernetics 52, 1985, 141-152.
Kirkpatrick et al., "Optimization by Simulated Annealing" Science, 220(4598), 1983, 671-680.
Geman et al., "Stochastic Relaxation, Gibbs Distributions, and the Bayesian Restoration of Images", IEEE Trans. Pat. Analysis and Mach. Int., V. Pami-6(6), 1984, 721-741.
Matsuba, I., "Optimal simulated-annealing method based on stochastic-dynamic programming", Physical Review A, 39(5), 1989, 2635-2642.
Amit, D. J., "Modeling Brain Function", Cambridge University Press, 1989, 118-125.
Grest et al., "Cooling-Rate Dependence for the Spin--Glass Ground-State Energy: Implications for Optimization by Simulated Annealing", Physical Review Letters 56(11), 1986, 1148-1151.
Cortes et al., "A Network System for Image Segmentation", IJCNN, Jun. 1989, I-121-I-125.
McClelland et al., Explorations in Parallel Distributed Processing, MIT Press, 1988, 49-81.
Szu, H., "Fast Simulated Annealing", Neural Networks for Computing, 1986, 420-425.
Hartman et al., Explorations of the Mean Field Theory Learning Algorithm, MCC Tech. Rept., Dec. 1988.
Bilbro et al., "Optimization by Mean Field Annealing", Advances in Neural Info. Proc. Syst. I, 1989, 91-98.

*Primary Examiner*—Michael R. Fleming
*Assistant Examiner*—Robert W. Doans
*Attorney, Agent, or Firm*—Antonelli, Terry, Stout & Kraus

[57] ABSTRACT

A neural network system includes an input unit, an operation control unit, a parameter setting unit, a neural network group unit, and a display unit. The network group unit includes first and second neural networks. The first neural network operates according to the mean field approximation method to which the annealing is added, whereas the second neural network operates in accordance with the simulated annealing. Each of the first an second neural networks includes a plurality of neurons each connected via synapses to neurons so as to weighting outputs from the neurons based on synapse weights, thereby computing an output related to a total of weighted outputs from the neurons according to an output function. The parameter setting unit is responsive to a setting instruction to generate neuron parameters including synapse weights, threshold values, and output functions, which are set to the first neural network and which are selective set to the second neural network. The operation control unit responsive to an input of a problem analyzes the problem and then generates a setting instruction based on a result of the analysis to output the result to the parameter setting unit. After the neuron parameters are set thereto, in order for the first and second neural network to selectively or to iteratively operate, the operation control unit controls operations of computations in the network group unit in accordance with the analysis result and then presents results of the computations in the network group unit on the display unit.

25 Claims, 18 Drawing Sheets

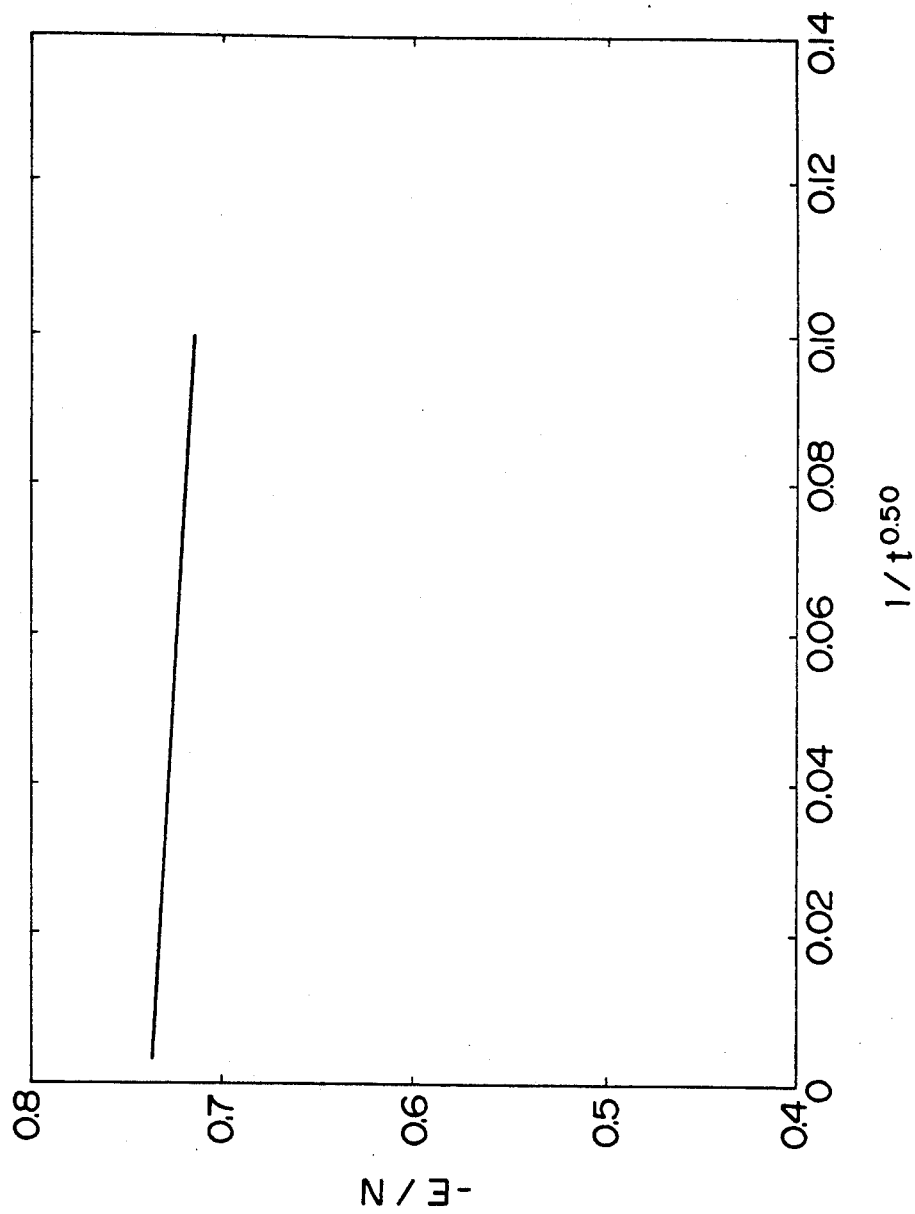

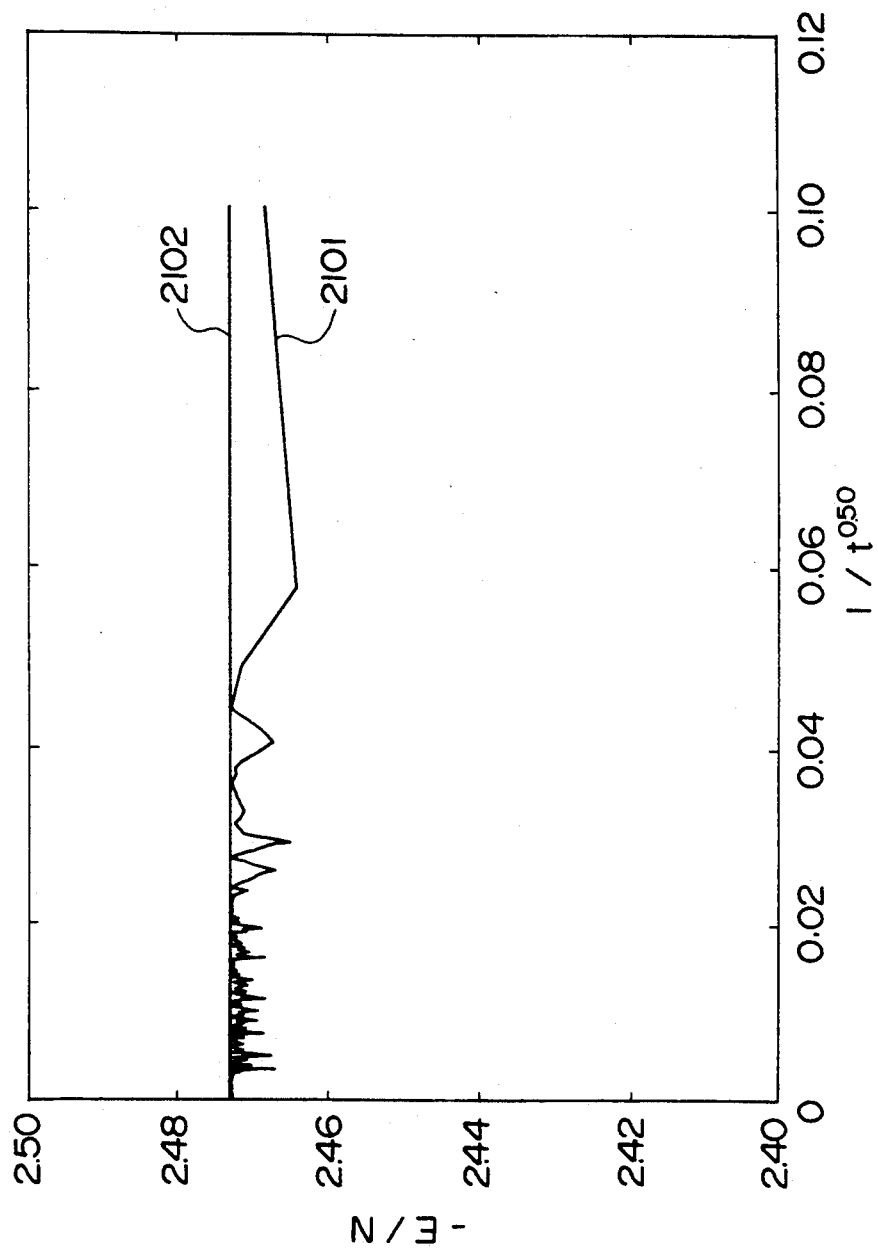

NEURAL NETWORK SYSTEM FOR DETERMINING OPTIMAL SOLUTION

BACKGROUND OF THE INVENTION

The present invention relates to a neural network system, and in particular, to a neural network system capable of determining an optimal solution to a problem at a high speed.

Heretofore, a neural network, handling an optimization Problem has been described in "'Neural' Computation of Decisions in Optimization Problems", Biological Cybernetics, 52, (1986), pp. 141-152 (to be referred to as reference 1 herebelow). In reference 1, a method of determining a local minimum has been described. Moreover, as a method of determining an optimal solution, there exists a simulated annealing method which has been described in "Optimization by simulated annealing", Science, 220, 4598 (1983), pp. 671-680 (to be referred to as reference 2 herebelow). A cooling schedule used by the simulated annealing method has been proposed in "Stochastic Relaxation, Gibbs Distributions, and the Bayesian Restoration of Images", IEEE, PAMI6 (1984), pp. 721-741 (to be referred to as reference 3 herebelow) and in "Optimal simulated-annealing method based on stochastic-dynamic programming", PHYSICAL REVIEW A, 5, 39 (1989), pp. 2635-2642 (to be referred to as reference 4 herebelow).

An application of a mean field approximation method to a spin glass system has been described in "Modeling Brain Function", Cambridge University Press, (1989) (to be referred to as reference 5 herebelow). An estimation of an optimal solution according to the simulated annealing method in a spin glass system has been proposed in "Cooling-Rate Dependence for the Spin-Glass Ground-State Energy: Implication for Optimization by Simulated Annealing", PHYSICAL REVIEW LETTERS, 11, 56 (1986), pp. 1148-1151 (to be referred to as reference 6 herebelow).

A technological formulation of a securities portfolio problem to be considered as an example of the application field has been formulated by "Portfolio Selection", Yale University, (1959) (to be referred to as reference 7 herebelow).

However, the neural network systems above have been attended with the following problems. In the conventional method of reference 1, when the energy state of the neural network is trapped in a local minimum depending on a distribution of the initial states of neurons, it is impossible for the energy state to escape therefrom. In order for the energy state of a neural network of a single interconnecting type to escape from the local minimum and to reach a global minimum, there is required an operation such as a tunnel effect for passing through an energy barrier. In reference 2, to overcome this problem, there has been devised a simulated annealing (SA) method in which a probability is introduced to the transition of the energy state of the network and the annealing is combined with the probability from analogy to physics.

In the simulated annealing method, the state transition in a direction in which the energy of the network increases is allowed on the basis of a probability q which depends on a temperature $T(t)$ of the network. Owing to the fluctuation effect thus introduced to the network, the energy state can pass through the energy barrier. Moreover, when the network temperature $T(t)$ is lowered to gradually decrease the probability q, the energy state of the network can reach a global minimum without being captured by a local minimum. Namely, the energy state can be converged thereto. A representative cooling schedule has been proposed by S. Geman et al. in reference 4 as follows.

$$T(t) = T_0/\log(t + 1) \qquad (1)$$
$T_0$: constant

In the neural network system adopting the simulated annealing method, although the network can escape from the energy state, as a local minimum, there has been a problem that a long period of time is required for the computation. Furthermore, in both above systems, it has not been guaranteed that constraints are satisfied in any situations.

The spin glass system described in reference 5 is an alloy system in which a small amount of magnetic atoms (for example, iron atoms) are mixed with non-ferromagnetic metal (for example, copper). In this alloy system, the axis of the spin of each electron of the atoms may be oriented to either one of the directions related to the ferromagnetism and diamagnetism, respectively. Consequently, the respective electrons interact with each other with a nonuniform force therebetween and the energy state of the spin glass system may take many local minima. When there exist many local minima, it is difficult to obtain the global minimum, namely, the optimal solution. Therefore, based on a solution to a problem of the spin glass, the performance of the neural network system can be judged. In a neural network system in which the mean field approximation method is applied to the spin glass system, the optimal solution is only estimated, and, it is not guaranteed that the optimal solution is obtained.

Attempts proposed to solve optimization problems with constraints by a neural network system of an interconnecting type are related to quadratic programmings in which an objective function can be represented in a quadratic form; moreover, in many cases, the attempts are associated with a 0-1 problem in which each variable is limited to take a binary value or either one of two values. Linear constraints are embedded in the objective function in the format in which the constraints are added thereto. In these methods of solution, there have existed the following problems. Namely, since the target of the optimization is minimization of the objective function, the constraints are not necessarily satisfied. Moreover, the solution is limited to discrete values.

SUMMARY OF THE INVENTION

It is therefore an object of the Present invention, to provide a neural network system in which the energy state can escape from the local minimum so as to rapidly compute solutions in the vicinity of the optimal solution, the obtained solutions can be limited to feasible solutions satisfying the constraints, parameters can be easily adjusted so that regardless of the size of the network and the initial state distribution of neurons thereof, the solutions can be attained in a broad range in a stable manner.

In order to achieve the object above a neural network system according to the present invention includes an input unit, an operation control unit, a parameter setting unit, a neural network group unit, and a display unit. The network group unit includes first and second neural networks. The first neural network operates according to the mean field approximation method to which the annealing is added, whereas the second neural network operates in accordance with the simulated annealing. Each of the first and second neural networks includes a plurality of neurons each connected via synapses to neurons so as to weight outputs from the neurons based on synapse weights, thereby computing an output related to a total of weighted outputs from the neurons according to an output function. The parameter setting unit is responsive to a setting instruction to generate neuron parameters including synapse weights, threshold values, and an output function, which are set to the first neural network and which are selectively set to the second neural network. The operation control unit responsive to an input of a problem analyzes the problem and then generates a setting instruction based on a result of the analysis to output the result to the parameter setting unit. After the neuron parameters are set thereto, in order for the first and second neural network to selectively or to repeatedly operate, the operation control unit controls operations of computations of the network group unit in accordance with the analysis result and then presents results of the computations of the network group unit on the display unit.

In accordance with the present invention, as compared with the conventional neural network, there can be obtained better solutions to an optimization problem at a high speed. Moreover, the solutions thus attained can be limited to feasible solutions satisfying constraints. In addition, in the securities portfolio problem described as an example of the mathematical programming problem, distribution ratios can be employed to solve the problem. Furthermore, when the present invention is applied to an associative memory, there can be materialized a memory system operating with a reduced interference.

BRIEF DESCRIPTION OF THE DRAWINGS

These and other objects and advantages of the present invention will become apparent by reference to the following description and accompanying drawings wherein:

FIG. 16 is a graph showing an asymptotic characteristic of the energy state in the AMFA neural network system according to the present invention;

FIG. 21 is a graph showing an asymptotic characteristic of the energy state in the iterative calculations with constraints in the SA neural network system.

DESCRIPTION OF THE PREFERRED EMBODIMENTS

Figure 1A:
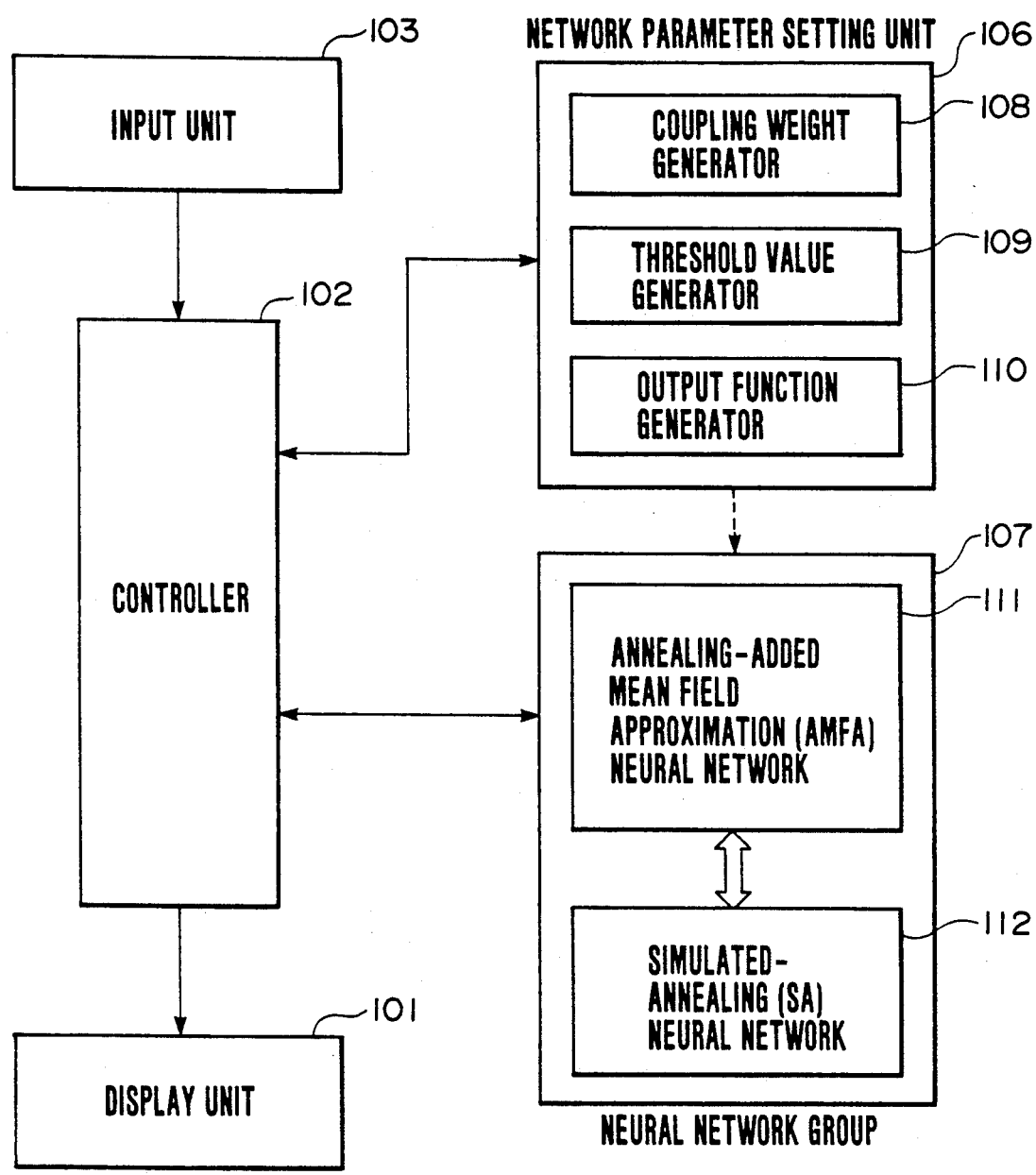
FIG. 1A is a block diagram schematically showing the configuration of a neural network system according to the present invention.

Referring now to the drawings, a description will be given in detail of a neural network system in accordance with the present invention.

First, the configuration of a neural network system in an embodiment of the present invention will be described by reference to FIG. 1A.

Figure 2:
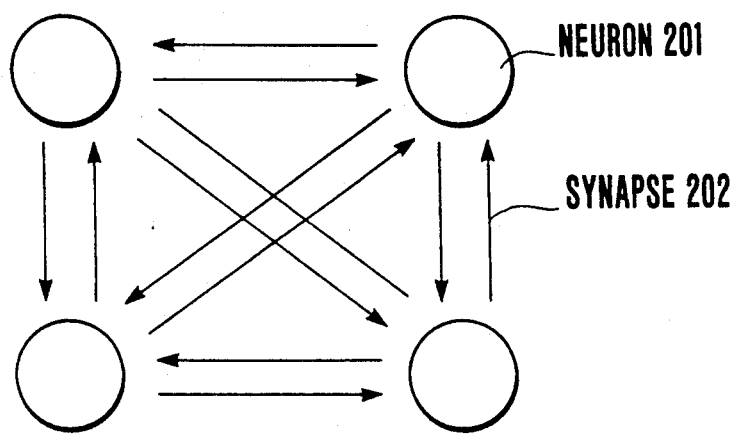
FIG. 2 is a diagram showing the constitution of an interconnecting-type neural network system.
Figure 3:
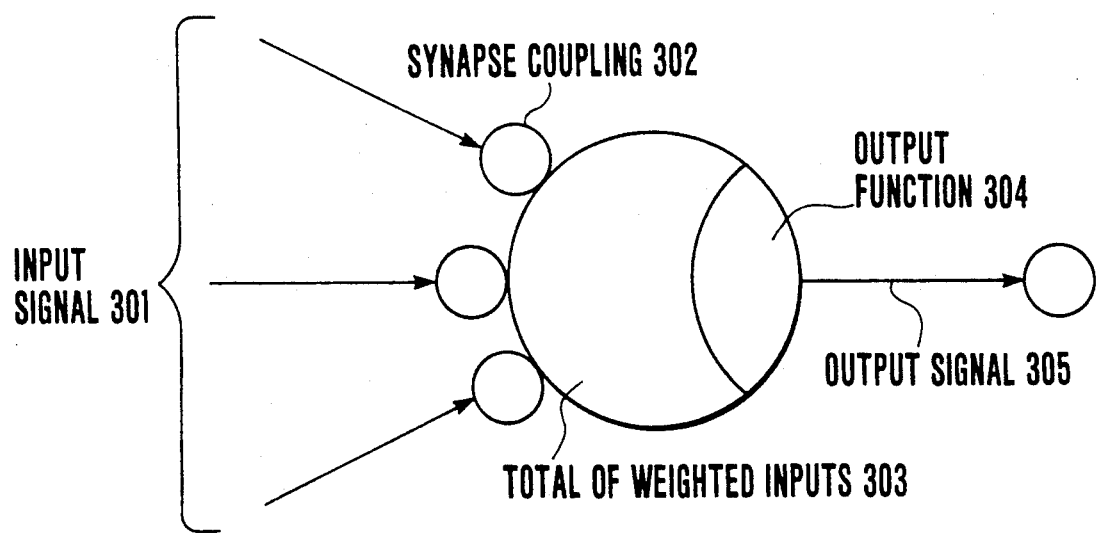
FIG. 3 is a diagram showing the structure of each neuron of FIG. 2.

The neural network system includes an input unit 103, a controller 102, a network parameter setting unit 106, a neural network group 107, and a display unit 101. The unit 106 includes a coupling weight generator 108 for generating coupling weights for synapse couplings, a threshold value generator 109 for generating threshold values of output functions, and an output function generator 110 for generating output functions. The group 107 includes an annealing-added mean field approximation (AMFA) neural network 111 and an SA neural network 112. The AMFA neural network 111 operates in accordance with a mean field approximation method to which the annealing is added, whereas the SA neural network operates according to the simulated annealing method. As shown in FIG. 2, each of the neural networks 111 and 112 includes a plurality of neurons and is of an interconnecting type. Each neuron is connected via synapses to outputs of all neurons including an output of its own and weights each output from the neurons according to a coupling weight assigned to each synapse associated therewith. As can be seen from FIG. 3, each neuron computes its output from the weighted outputs supplied from the neurons, i.e., a total of the weighted inputs (an internal state of the neuron) in accordance with an output function and a threshold value. The energy state of each of the neural networks 111 and 112 is determined as a result of cooperative and competitive operations between the respective neurons.

Figure 1B:
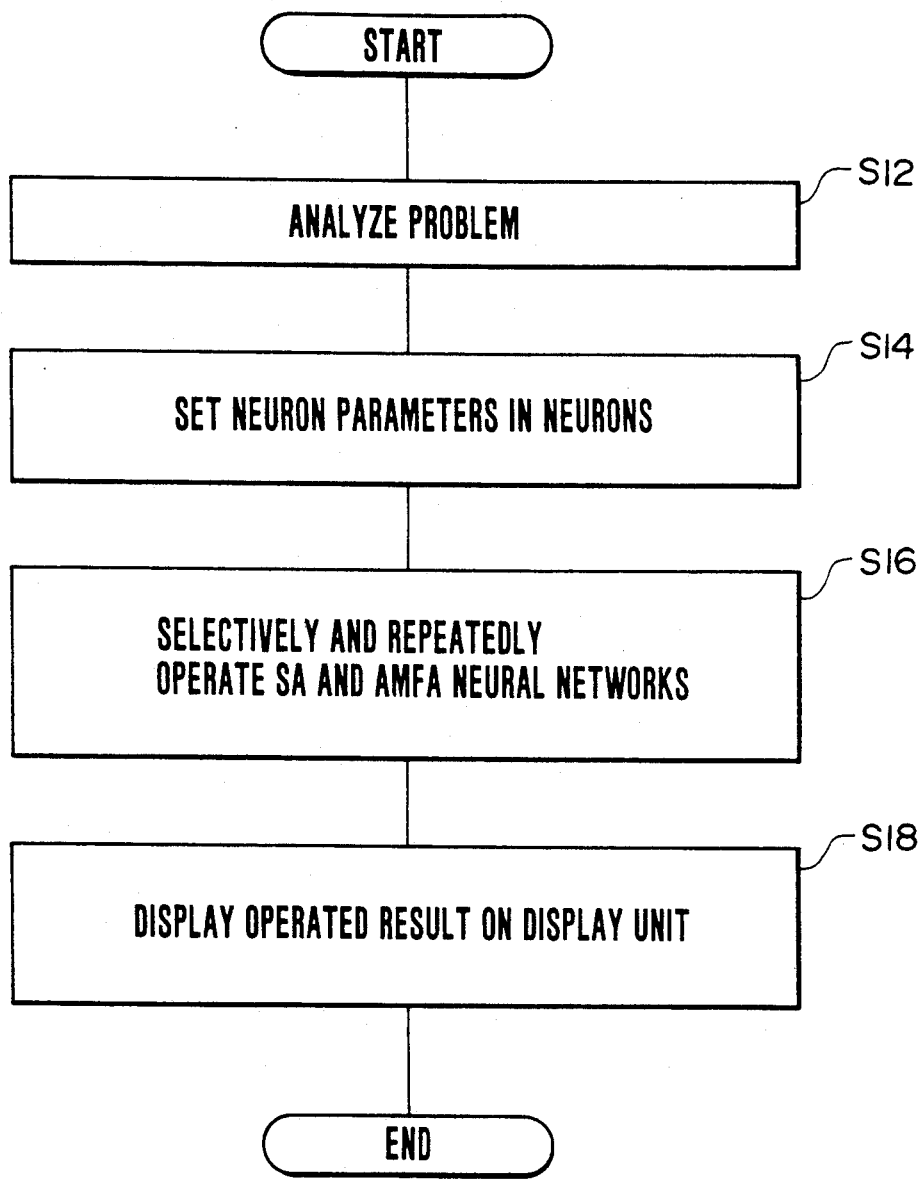
FIG. 1B is a flowchart for explaining the operation of the neural network system according to the present invention.

Next, the operations of the controller 102 and the neural network systems 111 and 112 will be described with reference to FIG. 1B.

In a step S12, a problem is inputted from the input unit 103 to the controller 102 and then the problem is analyzed by the controller 102. The controller 102 determines, for example, whether or not the problem includes many local minima or whether or not the problem is to be solved with constraints. In addition, a check is made to determine whether or not the problem is solved at a high convergence speed.

In a step S14, the controller 102 generates and outputs a network parameter setting instruction to the setting unit 106 according to the analysis result. In response thereto, the setting unit 106 initiates the generators 108 to 110 to generate coupling weights, thereshold values, and an output function for each neuron. The generated coupling weights, threshold values, and output functions are set to the networks 111 and 112.

In a step S16, the controller 102 determines depending on the analysis result, which one of the networks 111 and 112 of the network group 107 is to be used or whether or not these networks 111 and 112 are to be repeatedly used beginning from either one thereof to solve the problem. After the network parameters are set, the controller 102 selectively initiates the network 111 and 112 based on the decision result.

In a step S18, the controller 102 presents on the display unit 101 the computation results from the network group 107.

Subsequently, a description will be given of the operation of the neural networks respectively conforming to the AMFA and hybrid methods according to the present invention. In the following description, features of the AMFA and hybrid methods will be clarified by comparing the neural networks of these methods with the neural network of the simulated annealing method. For this purpose, the simulated annealing method will be first described.

In order for a neural network of an interconnecting type to escape from a local minimum and to reach a global minimum, there is necessitated an operation such as the tunnel effect to pass through an energy barrier. To overcome this problem, in the SA neural network of reference 2, a probability is introduced to a transition of the energy state of the network so as to devise the hybrid method in which the probability is combined with the annealing from analogy to physics.

Figure 4:
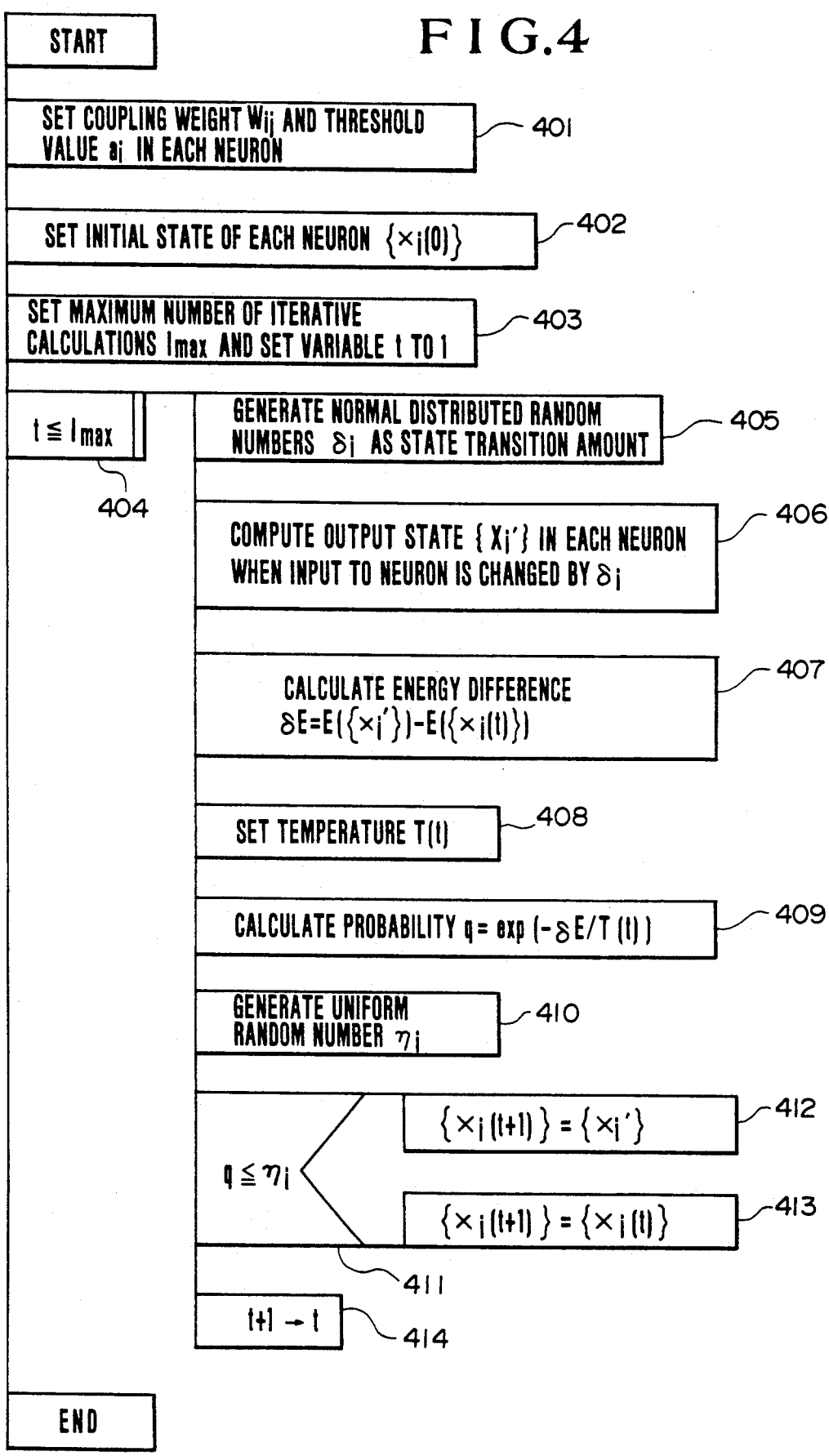
FIG. 4 is a problem analysis diagram (PAD) useful to explain the operation of a neural network system according t the simulated annealing (SA) method.
Figure 5:
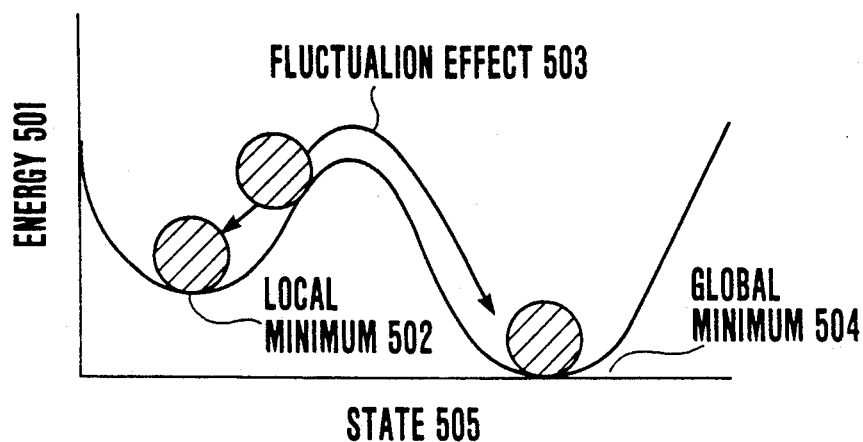
FIG. 5 is a graph for explaining the fluctuation effect.

In accordance with the present invention, the simulated annealing method undergoes appropriate modifications and then the performance thereof is checked. In the following paragraphs, with reference to the problem analysis diagram of FIG. 4, the operation of the neural network system according to the simulated annealing method will be described. Assume that the output state of an i-th neuron at a point of time t is $X_i(t)$, the i-th neuron has a threshold value $a_i$, and a coupling weight between the i-th and j-th neurons is $w_{ij}$.

In a step 401, the coupling weight $W_{ij}$ and the threshold value $a_i$ generated respectively by the coupling weight generator 108 and the threshold value generator 109 of the network parameter setting unit 106 are set to the SA network 112 by the controller 102. When necessary, an output function is also generated by the output function generator 110 to be set to the network 112.

In a step 402, the initial state $\{X_i(0)\}$ of the output of each neuron is established. This is achieved by supplying a total of weighted inputs from the controller 102 to each neuron.

In a step 403, the maximum iteration count Imax is set in the controller 102 and the time, i.e., the variable of iterative calculation count is set as $t=1$.

In a step 404, whether or not $t \leq$ Imax is satisfied is determined by the controller 102 and if Y in this case, the computation is terminated.

In a step 405, normal random numbers $\delta_i$ are generated as state transition amounts by the controller 102.

In a step 406, an output state $\{X_i'\}$ each neuron when the input thereto is changed by $\gamma_i$ is computed.

In a step 407, $\delta E = E(\{X_i'\}) - E(\{X_i(t)\})$ is computed by the controller 102.

In a step 408, a temperature parameter $T(t)$ is set by the controller 102.

In a step 409, $q = \exp(-\delta E/T(t))$ is computed.

In a step 410, uniform random numbers $\eta_i$ are generated by the controller 102.

In steps 411 to 413, if $q \leq \eta_i$, $\{X_i'\} \rightarrow \{X_i(t+1)\}$ is conducted and if $Q > \eta_i$, $\{X_i(t)\} \rightarrow \{X_i(t+1)\}$ is achieved.

In a step 414, $t+1 \rightarrow t$ is accomplished and then control is passed to the step 404.

In the above equation (1), the temperature T depends only on the number of iterations t. Assuming here that the temperature T is a function which depends not only on the time t but also on the energy, when the energy state falls in a local minimum, if a large fluctuation is given to the network, it is possible to increase the speed of the convergence of the energy state to a global minimum. For this purpose, a period of time to be taken before the energy state reaches the global minimum is represented by a cost function so as to obtain a temperature $T_{opt}$ minimizing the value of the cost function based on a probabilistic dynamic programming. A result obtained in reference 4 is as follows.

$$T_{opt} = \theta / \int \{1/E(\{X_i\})'\} dx \qquad (2)$$

where, an apostroph "'" indicates a partial differential with respect to the energy state and $\theta$ can be approximately regarded as a constant. The above method is an annealing method called an optimal simulated-annealing method.

Figure 6A:
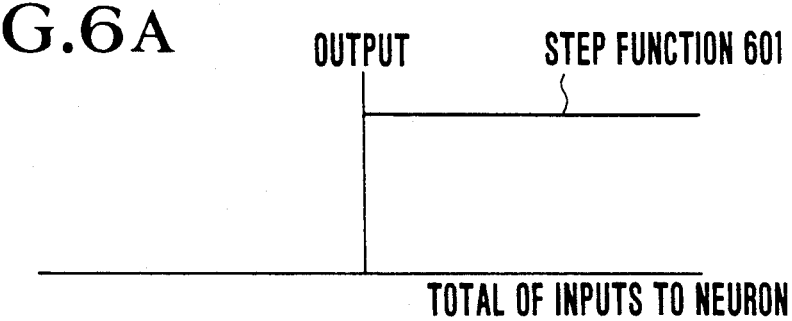
FIGS. 6A and 6B are graphs showing relationships between a total to inputs to a neuron and an output therefrom when the output functions of the neurons are a step function and a sigmoid function, respectively.
Figure 6B:
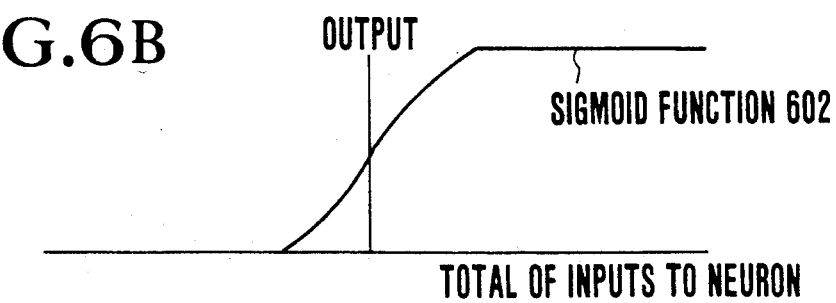

The output function of a neuron is not a step function 601 which takes only a binary value in a discrete manner as shown in FIGS. 6A and 6B but a sigmoid function 602.

$$f(x_i) = \tanh(X_i/U_0) \quad (3)$$

related to a differential gain characteristic as described in reference 1, and the output signal of the neuron is obtained as an analog quantity. In equation (3), when $U_0$ comes closer to a limit value 0, $f(x_i)$ becomes to be equivalent to a binary variable.

In this embodiment, normal random numbers having a standard deviation proportional to $$\sqrt{T(t)}$$

are adopted as transition amounts so that the transition amount is added to the internal state of each neuron obtained in the previous computation, thereby setting the neuron to a new output state. The larger the number of iterative calculations is, the smaller is the transition amount. Moreover, for an initial internal state of the neuron, there is set normal random numbers of which a mean value is an intermediate value of the neuron. With above provisions a rapid and stable convergence can been achieved.

The determination for achievement of the convergence may be conducted depending on whether or not the difference between the energy states of the network 111 before and after an iterative computation exceeds a predetermined value, whether or not the difference between the output state of each neuron of the network 111 before and after an iterative computation exceeds a preset value, or whether or not the current iterative calculation count exceeds a predetermined value.

The advent of the simulated annealing method employing a probabilistic fluctuation, as described above, theoretically makes it possible for the network energy state to reach the global minimum of the energy function. However, the simulated annealing method is also attended with a problem, namely, before the convergence to the global minimum, a remarkably large number of iterative computations are needed and hence quite a long period of computing time is required.

In this situation, it can be expected that the network state reaches a value near the global minimum in a short period of time if a method is employed in which a mean value of the output state of each of neurons subjected to the Boltzmann distribution $$q = \exp(-E(\{X_i\})/T(t)) \quad (4)$$

used in the simulated annealing method is approximately computed and then the temperature is varied to be closer to limit value 0. The mean value $<X_i>$ here is computed according to the mean field approximation method for reason of analogy to statistical mechanics. In an approximate equation of this type, a method of the present invention in which the temperature is set to be closer to zero is to be called an annealing-added mean field approximation method (to be abbreviated as an AMFA method herebelow).

In the neural network 112 utilizing the simulated annealing method, thanks to the fluctuation introduced in association with the adoption of the probability, the transition occurs from a local minimum solution to an optimal solution. However, in the neural network 111 employing the AMFA method, the state thereof converges to an approximate solution at a high speed according to an operational principle related to the decision theory.

Subsequently, the process of attaining the mean field approximation method will be briefly described in accordance with reference 5.

Figure 7:
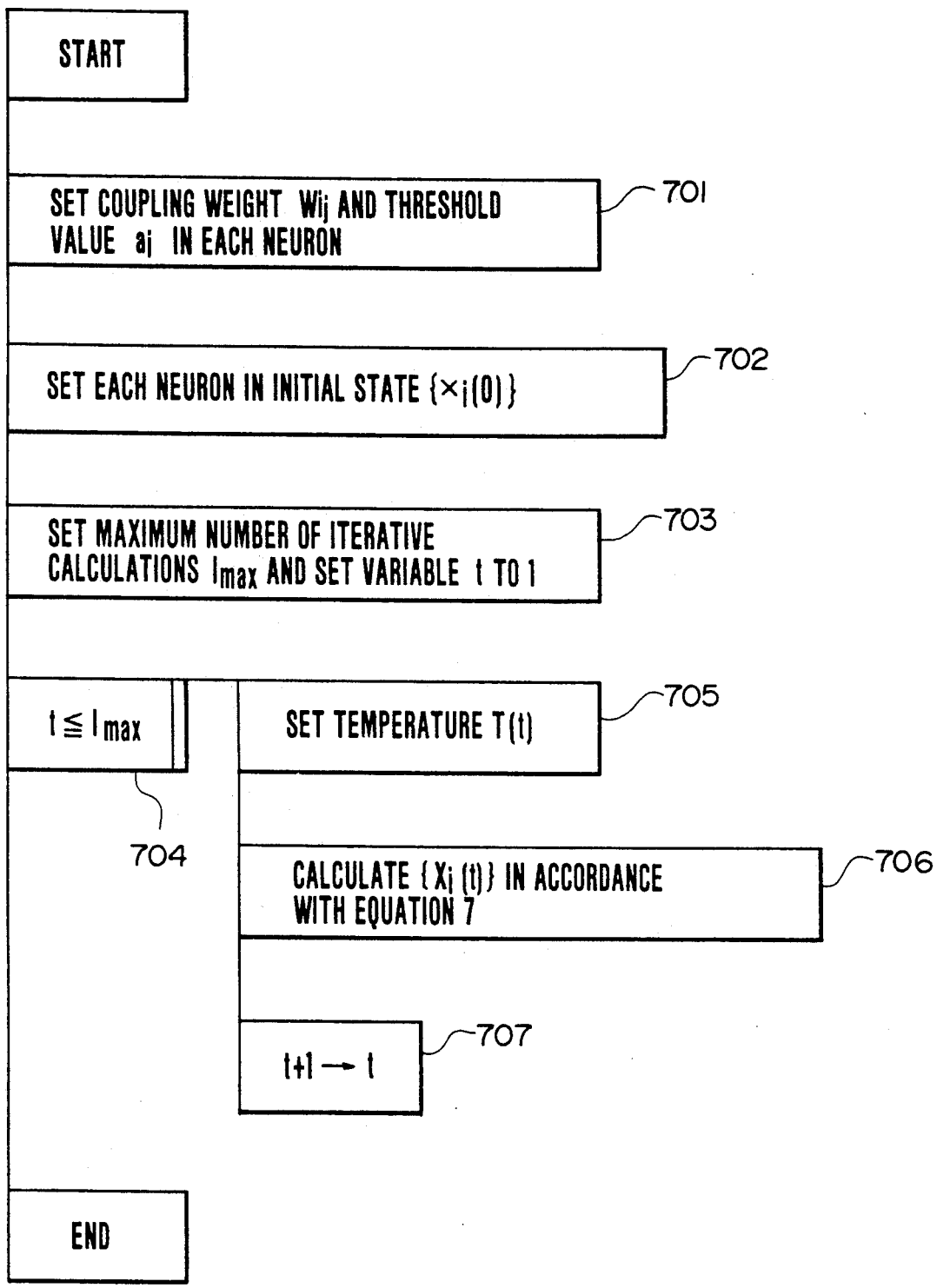
FIG. 7 is a problem analysis diagram useful to explain the operation of a neural network system in the annealing-added mean field approximation (AMFA) method according to the present invention.

In a neural network of an interconnecting type, the minimization of energy $$E(\{X_1\}) = -\sum_{i=1}^{N}\sum_{j=1}^{N} W_{ij}X_iX_j/2 + \sum_{i=1}^{N} a_i \quad (5)$$

can be replaced with the maximization of the equation (4) of the Boltzmann distribution. Applying the mean field approximation $$<X_i> = \tanh\{-\partial E(\{<X_i>\})/\partial <X_i> \cdot (1/T(t))\} \quad (6)$$

to equation (5), $\{<X_i>\}$ satisfies the following non-linear equation $$<X_i> = \tanh\left(\left(\sum_{j=1}^{N} W_{ij}<X_j> - a_i\right)/T(t)\right) \quad (7)$$

where, the possible state of the neuron is $X_i = \{-1, 1\}$ and $i = 1, \ldots, N$ when the number of neuron is N. It should be noted here that equation (7) includes a temperature parameter $T(t)$. In equation (7), if $T(t) \to 0$, $\{<X_i>\}$ is equivalent to $\{X_i\}$ when the Boltzmann distribution takes the maximum value. Next, referring to the problem analysis diagram of FIG. 7, a description will be given of the operation of the neural network system according to the AMFA method.

In a step 701, the coupling weight $W_{ij}$ and threshold value $a_i$ generated respectively by the coupling weight generator 108 and the threshold value generator 109 are set, and the output function is determined to satisfy equation (7).

In a step 702, the initial state of each neuron $\{X_i(O)\}$ is set by the controller 102.

In a step 703, in the controller 102, the maximum iteration count $I_{max}$ is set and $t = 1$ is established.

In a step 704, a check is made to determine whether or not $t \leq I_{max}$. If this is not the case the computation is terminated.

In a step 705, the temperature $T(t)$ is established.

In a step 706, the output state $\{X_i(t)\}$ is computed according to equation (7).

In a step 707, $t + 1 \to t$ is achieved and then control is passed to the step 704.

First, the initial state $\{X_i(O)\}$ of each neuron is set and then $\{X_i(t)\}$ satisfying equation (7) is obtained according to the iterative calculations. In this operation, in accordance with the present invention, the temperature parameter $T(t)$ is basically lowered in association with an increase in the iteration count. However, the temperature parameter may be set to a fixed value.

Figure 8:
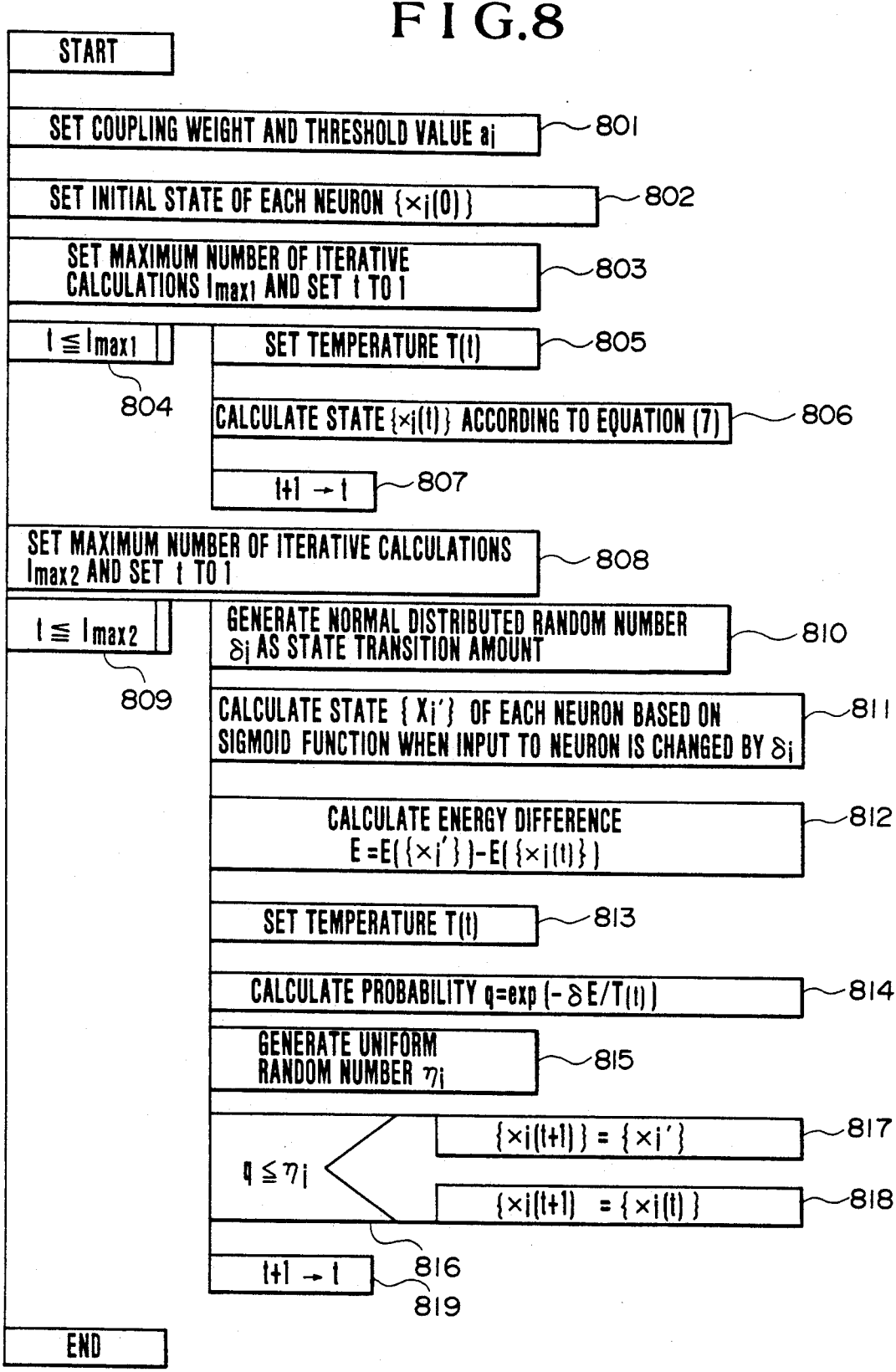
FIG. 8 is a problem analysis diagram for explaining the operation of a neural network system in the hibrid method according to the present invention.

In the neural network system according to the AMFA method, to attain a much more satisfactory solution, the internal state of each neuron in the AMFA network is used to represent an initial state distribution so as to initiate the SA network 112, thereby expectedly improving the quality of the solution. As above, the neural network system according to the method developed to improve the quality of the solution by the AMFA method is to be called a hybrid neural network system. Referring next to the problem analysis diagram of FIG. 8, the operation of the hybrid neural network system will be described.

In a step 801, the coupling weights Wij and the threshold values $a_i$ generated by the respective generators 108 and 109 are set to the network 111 by the controller 102.

In a step 802, the initial state of each neuron $\{X_i(O)\}$ is set by the controller 102.

In steps 803 to 807, the maximum number of iterative calculations is set and the AMFA method is effected in the network 111.

In steps 808 to 819, the states $\{X_i\}$ obtained by the steps 803 to 807 are set to the network 112, the maximum number of iterative calculations is set, and the SA method is conducted in the network 112.

In the hybrid neural network system, the sequence of the steps 803 to 807 and the steps 808 to 819 may be reversed or these steps related to the two methods may be alternately achieved several times.

In this regard, the convergence determining condition of the SA neural network 112 is also applicable.

Subsequently, a description will be given of results obtained by applying the conventional simulated annealing method and the AMFA and hybrid methods of the present invention to a spin glass problem. As described above, due to many local minima existing in the spin glass problem, it is difficult to determine an optimal solution. The efficiency of the present invention will be clarified through a discussion on this problem.

When a magnetic field $a_i$ acts upon a system in which a spin i interacts with another spin j with a magnitude of interaction $W_{ij}$, the energy function of this system is represented by equation (5). Namely, the spin glass system can be regarded as a system equivalent to a neural network of which coupling weights conform to a random distribution.

First, a description will be given of a case where the SA neural network system undergoes a transition to a global minimum of the energy state thereof. To set the cooling speed, let us employ the cooling schedule which has been proposed by S. Geman et al. in reference 3 and which is represented by the temperature $T(t)=T_0/\log(t+1)$.

Figure 9:
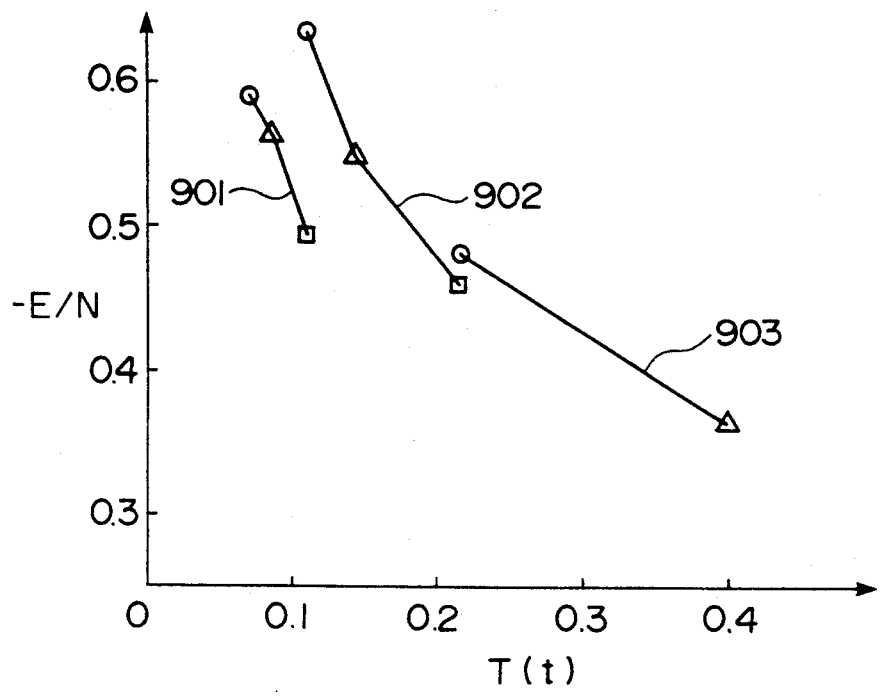
FIG. 9 is a graph showing an energy state transition when the cooling speed is altered in the SA neural network system.

First, results of experiment conducted to examine the difference in the energy state when the cooling speed of the cooling schedule is altered will be described. FIG. 9 shows results of experiments achieved under following conditions, that is, the number of neuron N is 800 and three polygonal lines i.e. a polygonal line 901: $1/\log(100t-98)$, a polygonal line 902: $1/\log(t+1)$, and a polygonal line 903: $1/\log(t/100+2)$ are adopted as three kinds of cooling schedules. In this graph, the ordinate and abscissa respectively stand for the value $-e/N$ attained by normalizing the energy based on the number of neurons and the temperature T(t). According to the cooling schedule of reference 3, the larger the number t of iterative calculations is, the lower the temperature T(t) becomes. In this connection, in each of these cooling schedules, the temperature is set to about $1/\log 2 \div 1.44$ in the first attempt of the iterative calculation.

In FIG. 9, a rectangle, a triangle, and a circle denote results of 100, 1000, and 10000 iterative calculations, respectively. The larger is the value on the ordinate, the lower is the energy, which also applies to the following graphs. Up to 1000 iterative calculations, the polygonal line 901 associated with a faster cooling speed reaches the lowest energy state; however, for the repetition count 10000, a reversion occurs between the polygonal lines 902 and 901 in the results. In this situation, the temperature of the polygonal line 902 is almost equal to that of the polygonal line 901 related to the iteration count 100. It can be presumably estimated that if an interation count larger than that used above by two orders of magnitude is used, a reversion may take place between the polygonal lines 903 and 902. That is, for the smaller iteration count, the line related to the faster cooling speed reaches the low energy state; whereas, when the iterative count is increased, the line associated with the slower cooling speed reaches the low energy state. In consequence, when the maximum number of iterative computations is set to a fixed value, it can be considered that the lower energy level can be reached by adjusting coefficients of the multiplication or addition of the variable t.

Next, a description will be given of discussion on comparison between numerical experiments conducted depending on the three kinds of cooling schedules, namely, a method in which the cooling schedule is determined in proportion to a reciprocal of an iteration count (T(t)=1/t), a method of S. Geman et al. of reference 3 (T(t)=1/ln (t+1)), and the optimal simulated-annealing method of reference 4. The method in which the cooling schedule is proportional to a reciprocal of the iteration count has been commonly adopted to increase the computation speed. Table 1 shows mean values and standard deviations of the energy computed according to the respective annealing methods when 25 kinds of different normal random numbers are given as the initial state distribution. The simulations here are conducted with the number of neurons and the number of iterative calculations to 400 and 10000, respectively.

TABLE 1

| | T(t) | | |
|---|---|---|---|
| −E/N | | 1/log (t + 1) | Optimal cooling |
| Mean value | 0.5038 | 0.5949 | 0.6291 |
| (Error %) | (33.6) | (21.6) | (17.1) |
| Standard deviation | 0.0255 | 0.0195 | 0.0195 |

Grest et al. have estimated an optimal solution of the similar problem in an AMFA neural network system and have attained a mean value of −E/N=0.759 (reference 6).

Comparing mean values therebetween, the optimal simulated-annealing method develops the lowest energy value. In the descending energy order, this method is followed by the method of Geman et al. and the method proportional to a reciprocal of the iteration count. For the standard deviation, although the method proportional to a reciprocal of the iteration count develops a slightly larger value, the values obtained according to the three methods are substantially equal to each other.

Figure 10:
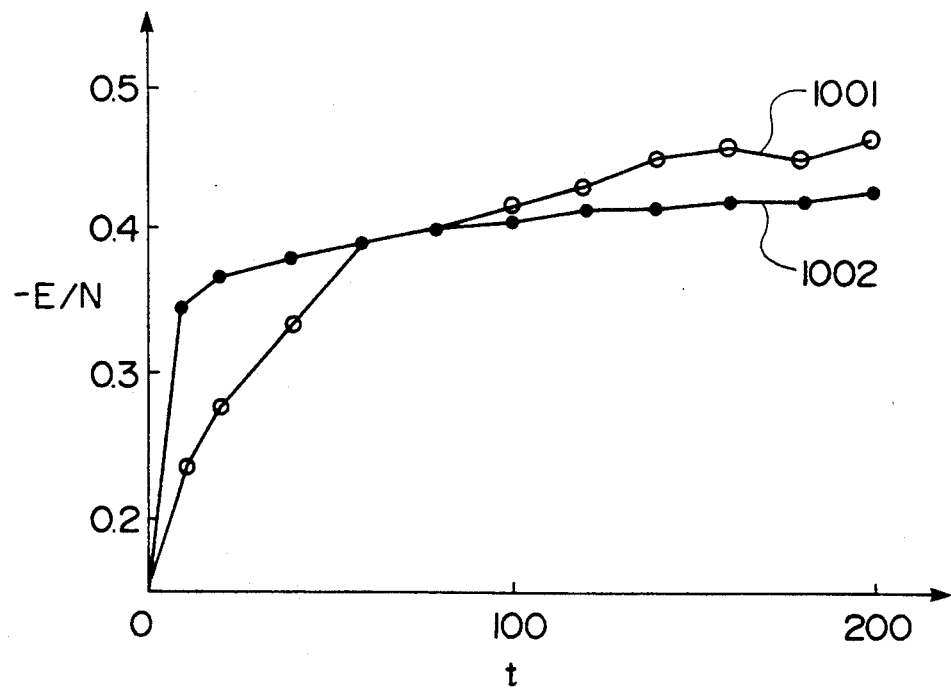
FIG. 10 is a graph showing an energy state transition when the number of iterative calculations or the iteration count is varied in the SA neural network system.

FIG. 10 shows the energy transition with respect to iteration counts when appropriate initial state distributions are specified in the method proportional to a reciprocal of the iteration count and the Geman3 s method of reference 3. In this graph, the ordinate and the abscissa respectively represent a value −E/N attained by normalizing the energy based on the number of neurons and the number t of iterative calculations. Up to about 40 iterative calculations, a polygonal line 1002 resultant from the method in which the temperature is proportional to a reciprocal of the iteration count is clearly in a lower energy state; however, when the repetition count is more than 100, a reversion takes place, i.e., a polygonal line 1001 resultant from the Geman's method takes a lower energy state. That is, for the smaller iteration count, the low energy state is reached when the method having a faster cooling speed in which the temperature is proportional to a reciprocal of the iteration count is used; however, for the greater number of iterative calculations, the low energy state is attained when the the Geman's method having a lower cooling speed is employed. Consequently, under a condition where the computation time is limited, although the method with the temperature proportional to a reciprocal of the iteration may be possibly effective, if a sufficiently large number of iterative calculations are allowed, the better result will be obtained according to the Geman's method. In consequence, in the SA neural network system, the method of S. Geman et al. is primarily adopted as the cooling schedule.

Figure 11:
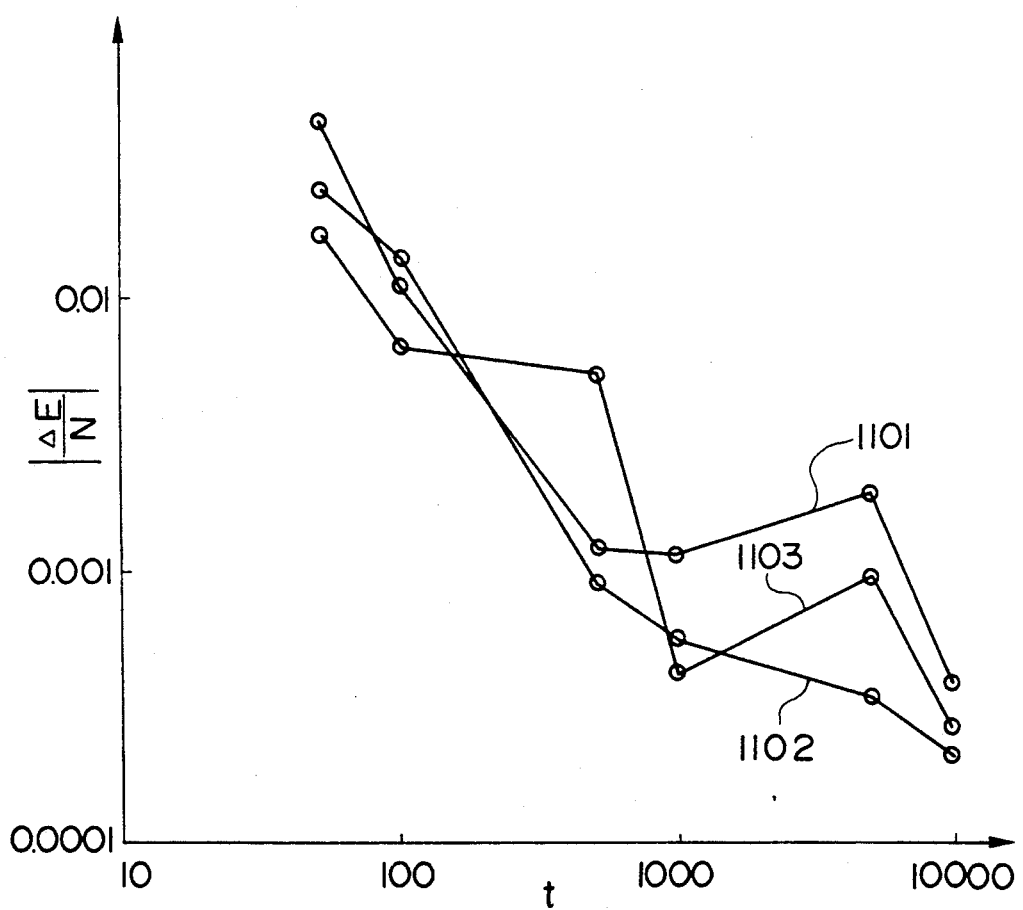
FIG. 11 is a graph showing the convergence speed when the number of neurons is changed in the SA neural network system.

FIG. 11 shows the convergence of the network when the number of neurons is set to 400 (polygonal line 1101), 800 (polygonal line 1102), and 1200 (polygonal line 1103) in which the ordinate and the abscissa respectively stand for the absolute value $|\neq E/N|$ of the energy difference between the current and previous states normalized by the number of neurons and the number t of iterative calculations. The Geman's method ($T(t) = 1/\log(t+1)$) is adopted as the cooling schedule. Although there appears discrepancy between the polygonal lines 1101 to 1103, it can be appreciated from FIG. 11 that the energy transition amount is generally reduced and these lines each have an analogous tendency for the convergence. Consequently, although the convergence speed of the spin glass system does not greatly depend on the number of neurons, there appears the discrepancy in the convergence processes to some extent.

Figure 12A:
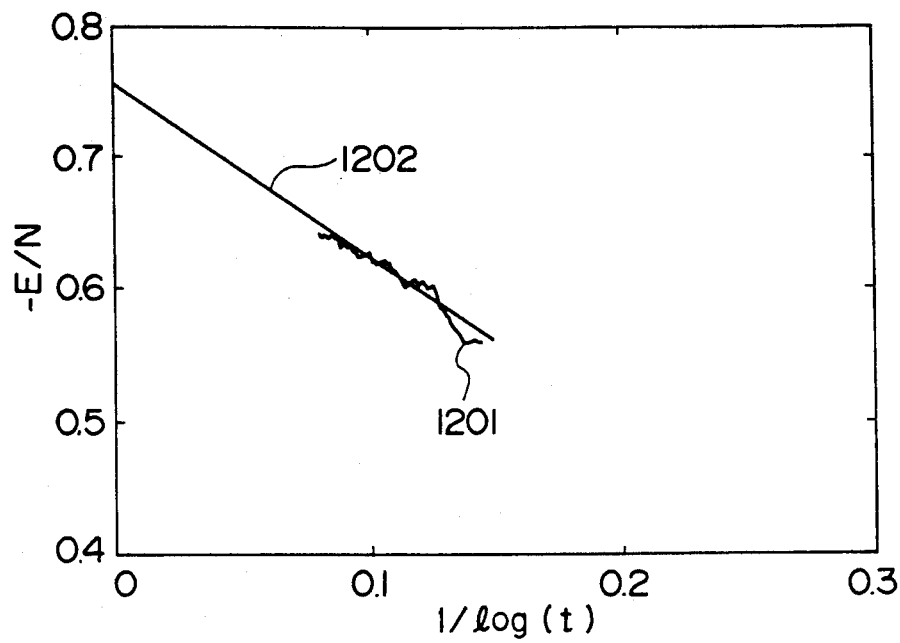
FIGS. 12A and 12B are graphs respectively showing asymptotic characteristics of the SA neural network system according to the Geman's method and the optimal simulated-annealing method.
Figure 12B:
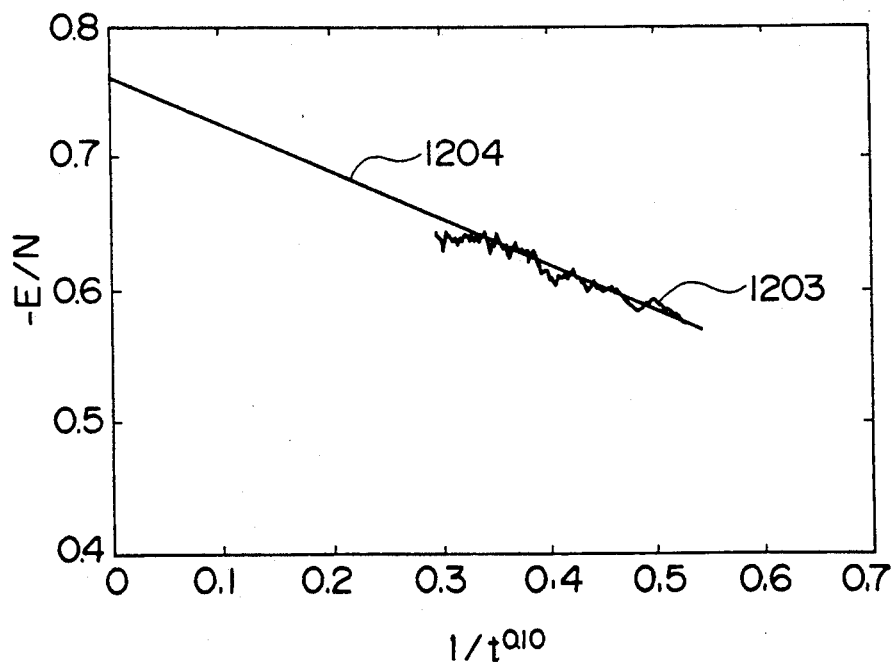

In reference 6, there has been cited that an ordinary SA neural network system develops an asymptotic characteristic with respect to the optimal solution which will be attained when an infinite number of iterative calculations are accomplished. FIG. 12 shows asymptotic characteristic lines 1202 and 1204 respectively related to two kinds of polyqonal lines 1201 and 1203 respectively developed according to the Geman's method ($T(t) = 1/\log(t+1)$) and the optimal simulated-annealing method employed as the cooling schedule. The iteration count and the number of neurons are here set to 100,000 and 625, respectively. The ordinate stands for a value $-E/N$ attained by normalizing the energy based on the number of neurons in these graphs; whereas, the abscissa represents an a reciprocal $1/\log(t)$ of the algorithmic function in FIG. 12A and a reciprocal $1/t^{0.1}$ of a power function in FIG. 12B. It can be understood from the scales thus employed that these results are qualitatively different from each other. However, in FIG. 12B related to the optimal simulated-annealing method, when the number of iterative calculations becomes a large value, the gradient of the asymptotic characteristic line tends to be gentle. This may be possibly caused, for example, by an influence from the initial state distribution and a temporary fluctuation in the iterative calculation process; however, the cause has not been exactly determined at the present stage.

According to reference 6, G. S. Grest et al. describe that an optimal solution to a ±1 problem (not adopting a sigmoid function) was estimated by a supercomputer to resultantly obtain the optimal solution as $-E/N = 0.759 \pm 0.004$ (for 800 neurons). FIGS. 12A and 12B respectively show optimal solutions $-E/N$ which are each about 0.76. Namely, it can be considered that the results are equivalent to that attained by G. S. Grest et al. Consequently, when the annealing method of S. Geman et al. and the optimal simulated-annealing method are applied to the SA neural network system, the optimal solution can be estimated by representing a reciprocal of the logarithmic function and a reciprocal of the power function along the abscissa of the graph showing the asymptotic characteristic.

Figure 13:
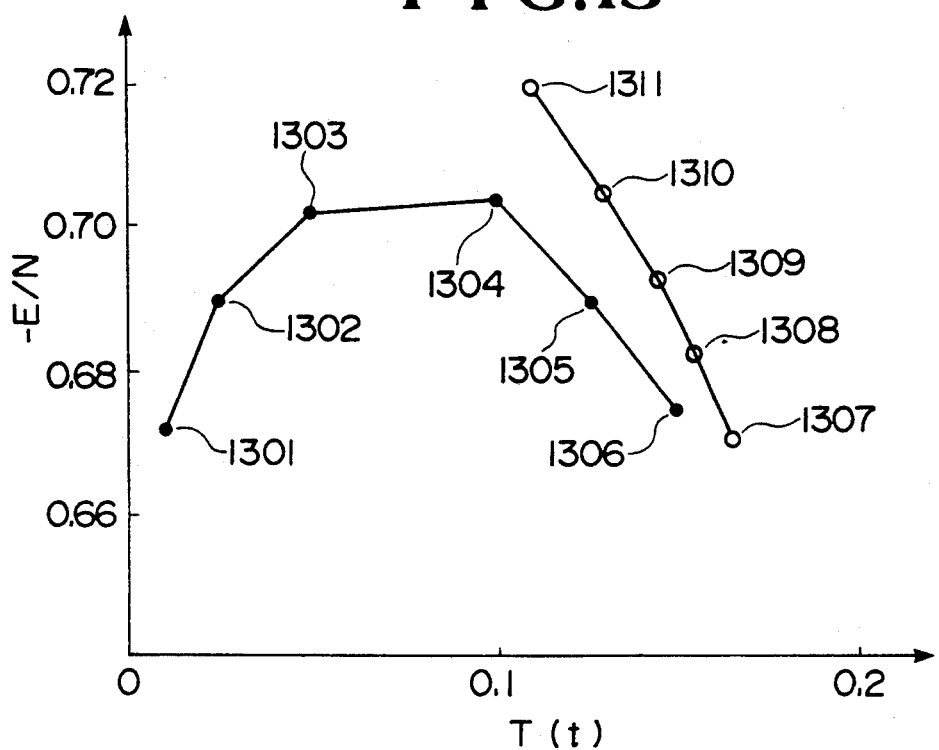
FIG. 13 is a graph respectively showing energy states of the AMFA neural network system according to the present invention when the system is at a fixed temperature and when the system temperature is gradually decreased.

Subsequently, assume that the spin glass problem is applied to the AMFA neural network system of the present invention to cause the spin glass system to take the minimum energy state. Equation (7) representing the operation of the AMFA neural network system includes a temperature parameter $T(t)$. FIG. 13 shows a computation result when the parameter is set to constant values in comparison with a result attained through the annealing. The ordinate and the abscissa respectively stand for a value $-E/N$ obtained by normalizing the energy by the number of neurons and the temperature $T(t)$, and the number of neurons is 625. Six constant temperature values (points 1301 to 1306) are adopted in the computation. For any constant values, the convergence occurs in an iteration count range not exceeding 100; moreover, the energy state rarely changes even when the number of iterative calculations is increased. The best result is $T = 0.1$ for the constant (1304). As the cooling schedule of the annealing, the Geman's method $T(t) = 1/\log(t+1)$ is adopted without any modification thereof.

In the graph, an energy state transition is shown in an iterative count range from 400 (1307) to 10000 (1311). After 400 iterative calculations, the energy value is not fully satisfactory, namely, at a level similar to that attained at the temperature set to the constant $T = 0.01$ (1301). However, the energy value after 10000 iterative calculations is more desirable as compared with that developed when the temperature is set to the constant $T = 0.1$ (1301). Consequently, it can be understood from the results above that when the temperature is not gradually lowered to zero, namely, when the temperature is set to a fixed value, there is obtained a satisfactory solution at a very high speed. However, if it is desired to attain a solution having a higher quality even when the computation time is elongated, the method in which the annealing is conducted to bring the temperature toward zero is found to be effective.

A comparative investigation has been achieved on results of experiments conducted in the neural network assigned with several different initial distributions under two conditions, i.e., constant value $T(t) = 0.1$ (iteration count 100) and constant value $T(t) = 2/\log(t+1)$ (iteration count 5000). Table two shows the mean values and standard deviations of the energy value computed in accordance with the respective annealing methods with the initial state distribution established by 50 different kinds of normal random numbers. The number of neurons are here set to 400.

TABLE 2

| -E/N | T(t) | |
|---|---|---|
| | 0.1 | 2/log (t + 1) |
| Mean value | 0.6975 | 0.7257 |
| (Error.%) | (8.1) | (4.4) |

TABLE 2-continued

| -E/N | T(t) | |
|---|---|---|
| | 0.1 | 2/log (t + 1) |
| Standard deviation | 0.0120 | 0.0064 |

Comparing mean values with each other, the results are similar to those of FIG. 13, i.e., the lower energy value is developed according to the cooling schedule $T(t)=2/\log(t+1)$. The error with respect to an energy value of the estimated optimal solution is about half that of the value obtained when $T(t)=0.1$ is employed. Resultant standard deviations indicate that the fluctuation of the energy value is larger when the fixed value is adopted. In short, it can be understood that the standard deviations considerably depend on how the initial distribution is specified. On the other hand, when the annealing is used, the behavior of the energy state is not influenced by the initial distribution, namely, the converged energy levels are similar to each other in both cases. These results imply the effectiveness of the annealing.

Figure 14:
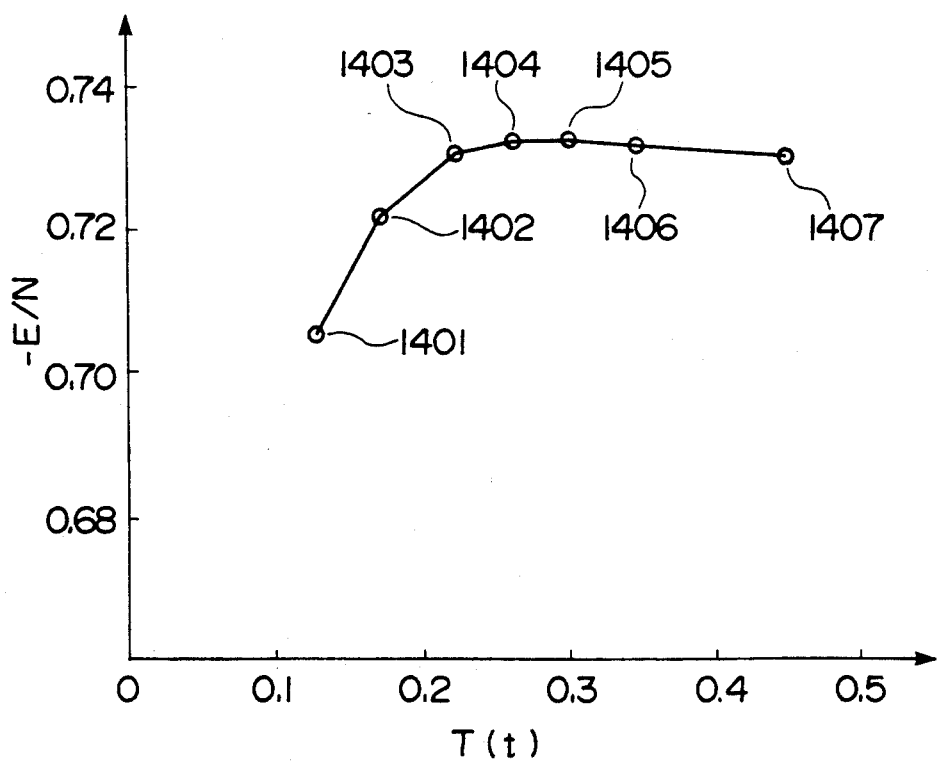
FIG. 14 is a graph showing an energy state transition when coefficients of the cooling schedule are altered in the AMFA neural network system according to the present invention.

Next, the difference between energy levels reached when the coefficient $T_0$ is altered in the cooling schedule $T(t)=T_0/\log(t+1)$ is shown in FIG. 14 wherein the ordinate and the abscissa respectively stand for a value, i.e., $-E/N$ obtained by normalizing the energy by the number of neurons and the temperature $T(t)$. The numbers of iterative calculations and neurons are set to 2000 and 625, respectively. As a result, the most satisfactory result is attained for $T_0=2$, i.e., $T(1000) = 2/\log 2001 \div 0.263$ (1404). When $T_0$ is reduced, namely, the temperature is decreased, the result is rapidly deteriorated for conditions 1405 to 1407; conversely, when $T_0$ is increased, although the result gradually becomes worse, the change in the result is quite small. Consequently, since $T_0$ need only to be set to about two or more, when the annealing method is applied to AMFA neural network system, the parameter can be advantageously established in an easy fashion.

Figure 15:
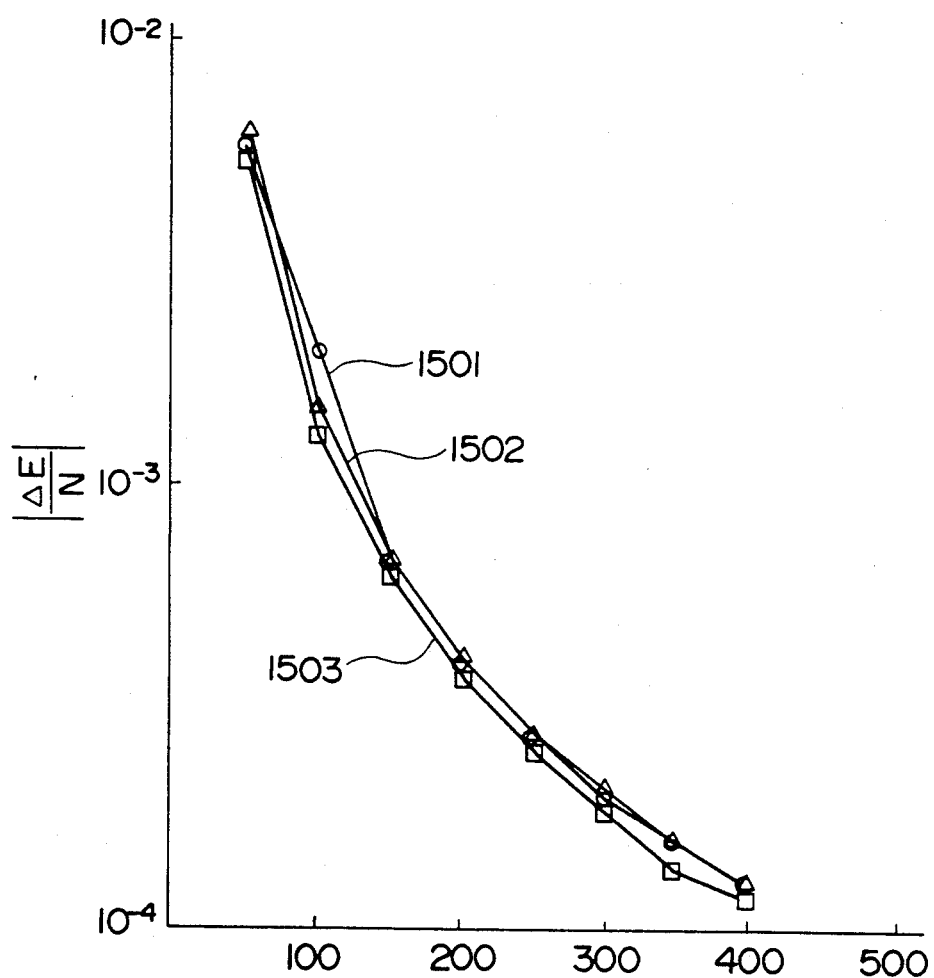
FIG. 15 is a graph showing an energy state transition when the number of neurons of the network is changed in the AMFA neural network system according to the present invention.

States of convergence in the neural network with the number of neurons set to 400 (1501), 800 (1502) and 1200 (1503) are shown in FIG. 15 wherein the ordinate and the abscissa respectively denote the absolute value $|\Delta E/N|$ the energy difference between the current and previous states, the value being normalized by the number of neurons, and the number of iterative calculations. The cooling schedule here is set as $T(t)=2/\log(t+1)$. Even when the number of neurons is varied, the convergence speed of the energy difference is substantially identical and the fluctuation thereof is quite small when compared with the results of the SA neural network system shown in FIG. 11. The discrepancy between the results possibly resides in that a probabilistic fluctuation is introduced to the SA neural network system; whereas, in the AMFA neural network system, the convergence is accomplished in a manner related to the decision theory without using the probability. Consequently, the AMFA neural network system expectedly leads to a stable solution without depending on the size of the network.

It has been found that like the SA system, the AMFA system also has the asymptotic characteristic. FIG. 16 shows the characteristic of the AMFA system with the ordinate representing the value $-E/N$ obtained by normalizing the energy by the number of neurons. The cooling schedule and the iteration count are set to $T(t)=2/\log(t+1)$ and 100,000, respectively. The abscissa stands for a reciprocal of the power function. As compared with the dependence of $1/t^{0.1}$ shown in FIG. 12B representing a similar tendency, the results of the method above show a dependence of $1/t^{0.5}$. Moreover, the energy state reaches a considerably low level in the initial computation stage and the change in the energy state is quite small even when the number of iterative calculation is increased.

Estimating the optimal solution in the AMFA neural network system based on FIG. 16, the energy state $-E/N$ related to the optimal solution is about 0.74. The difference between this energy state and that attained when the optimal solution is developed in the SA neural network system indicates that the AMFA neural network system is asymptotic and there exists a limitation with respect to the precision of the solution. However, the error which is about 2.6% is very small. In consequence, when representing the reciprocal of the power function along the abscissa for the asymptotic characteristic, the optimal solution can be obtained through an approximate estimation. Moreover, in an actual optimization, the error of the magnitude above can be regarded as insignificant when the high-speed computation is taken into consideration.

A numeric simulation has been conducted on a spin glass system based on a hybrid neural network system. First, in the state of the AMFA method, the cooling schedule is set as $T(t)=1/\log(t+1)$ (iteration count =5000). Next, in the stage of the simulated annealing method, as the cooling schedule, there is employed the method with the temperature proportional to a reciprocal of the iteration count ($T(t)=1/t$, iteration count 1000). Although the Geman's method ($T(t)=1/\ln(t+1)$) and the optimal simulated-annealing method have been attempted, the level of the energy state developed in the AMFA method is disadvantageously increased. It may be regarded as a cause of the increase in the energy level that due to the slow cooling speed, the large fluctuation is supplied in an excessive manner and hence the state of the system is disturbed. Consequently, it will be necessary to keep a certain relationship between the cooling speed and the magnitude of fluctuation.

With the number of neurons set to 800, computations achieved according to the hybrid method (AMFA: $T(t)=1/t$, iteration count=40,000; simulated annealing: $T(t)=1/T$, iteration count=1000) have resulted in $-E/N=0.7525$ (error=0.86%). The error is represented with respect to the minimum energy state $-E/N=0.759$ estimated in reference 6). Moreover, the optimal value computed in a considerably long period of time according to the simulated annealing method in reference 6 is attained as $-E/N=0.7512$ (error=1.03%). Namely, the result of the present method is more satisfactory than that of reference 6.

Figure 17A:
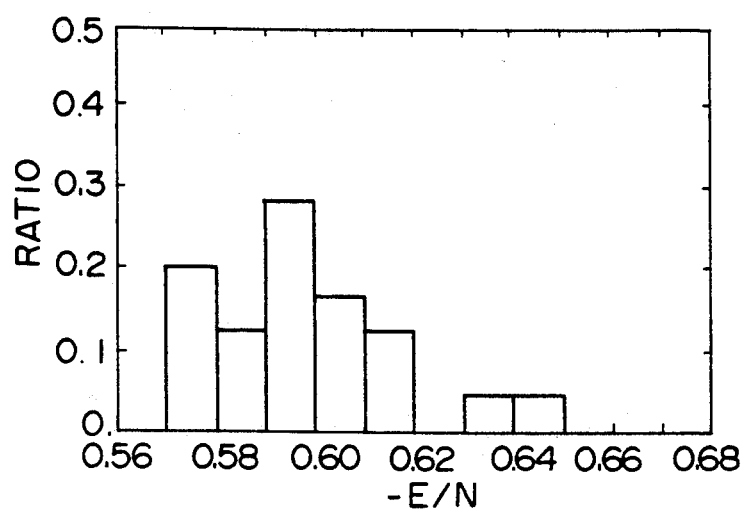
FIGS. 17A to 17C are histograms respectively showing appearance frequencies of the final energy states respectively of the SA, AMFA, and hybrid neural network systems when several distributions of random numbers are assigned as the initial state distribution of the network.
Figure 17B:
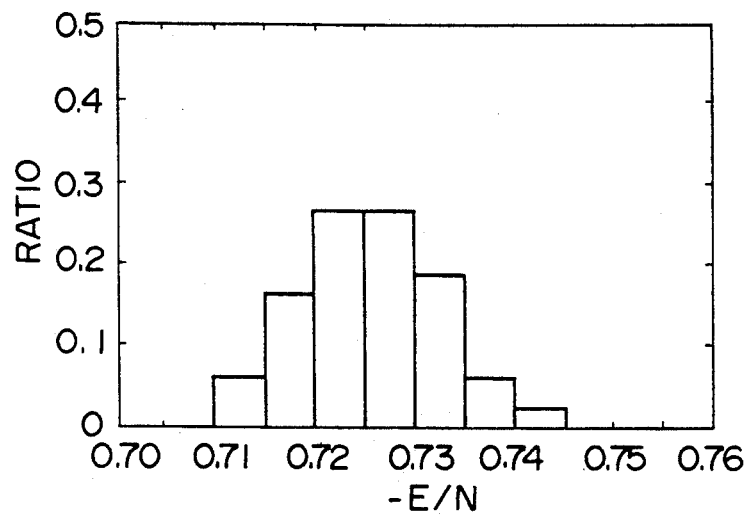
Figure 17C:
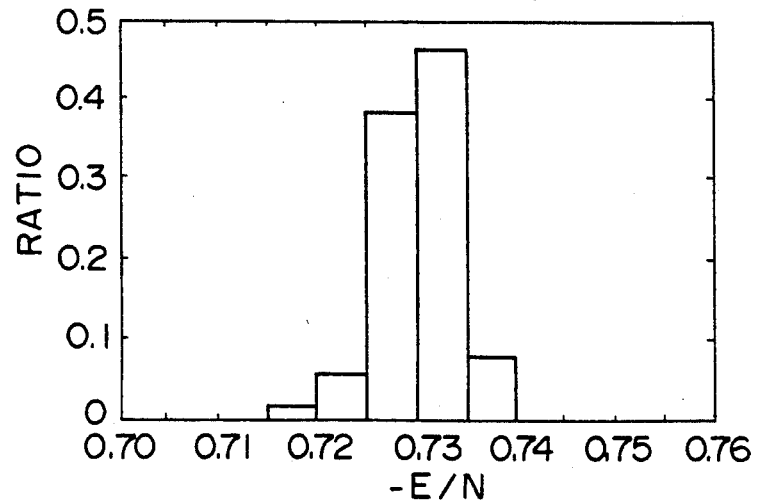

FIGS. 17A, 17B and 17C respectively show energy distributions which have been computed, based on several kinds of random numbers specified in accordance with the simulated annealing method ($T(t)=1/\log(t+1)$, iteration count 10,000), the AMFA method ($T(t)=2/\log(t+1)$, iteration count 5000), and the hybrid method (AMFA: $T(t)=1/\log(t+1)$, iterated count 5000; simulated annealing method: $1/t$, iteration count 1000). The ordinate and the abscissa respectively stand for a ratio of appearance frequency and a value $-E/N$ obtained by normalizing the energy by the number of neurons. In the computation, the number of neurons is set to 400, 25 kinds of normal random numbers are used as the initial state distribution of the simulated annealing method, and 50 kinds of normal random numbers are employed for the initial state distribution of the AMFA and hybrid methods. The lowest energy level is resultantly attained when the hybrid method is adopted. The AMFA method leads to a slightly higher energy level, and the simulated annealing method results in a high energy state. In this connection, finally, the mean energy value obtained in the hybrid method is $-E/N = -0.7302$ (error=3.8%). Consequently, the hybrid neural network system according to the present invention can be considered to develop the lowest energy level.

The standard deviations of the energy value are 0.0195, 0.0064, and 0.0041 in the simulated annealing method, the AMFA method, and the hybrid method, respectively. The simulated annealing method has the largest deviation. The AMFA method does not utilize the probability like that employed in the simulated annealing method and hence has a small deviation of the energy value. Although the hybrid method includes the simulated annealing method, the energy value is set to be considerably closer to the optimal solution in the AMFA method. Consequently, it cannot be considered that the deviation will be increased to an excessive extent. In other words, the AMFA and hybrid methods yield a stable energy state regardless of the values set as the initial state distribution.

Figure 18:
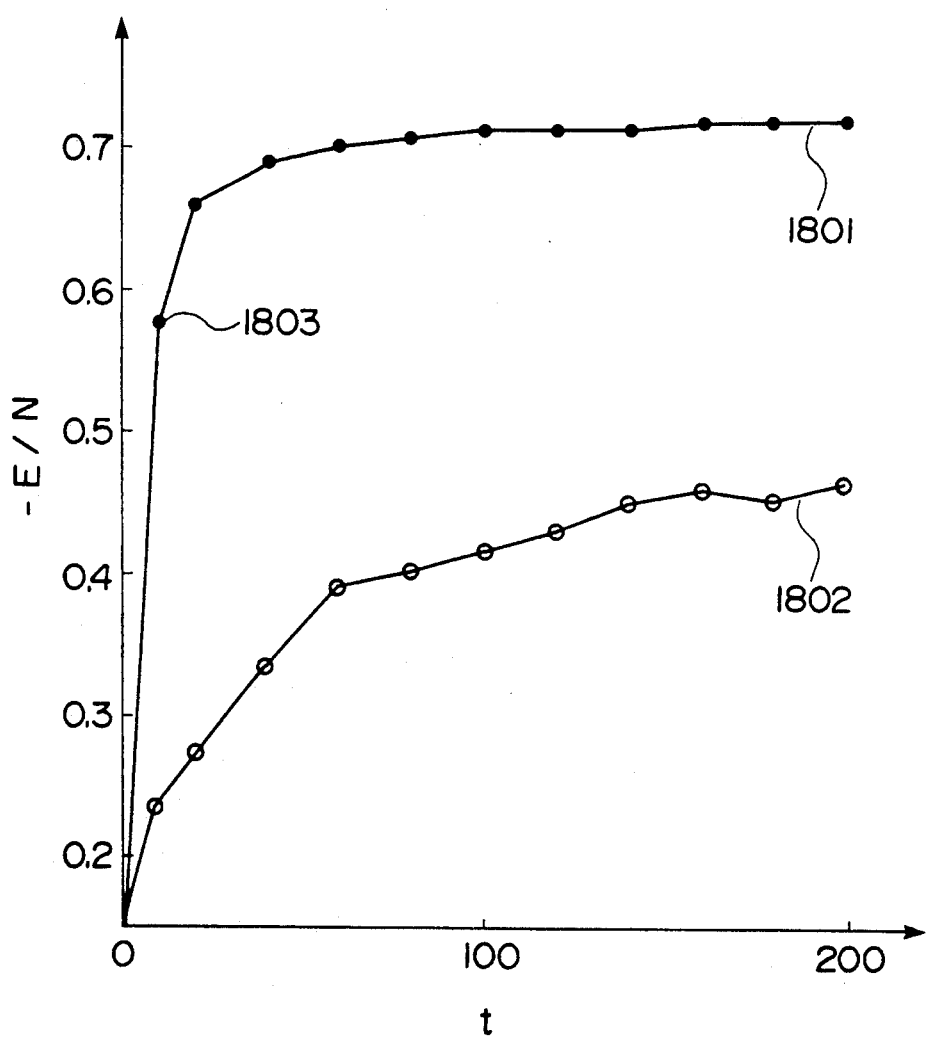
FIG. 18 is a graph showing differences in the convergence grade in the initial stage of the iterative calculations between the SA and AMFA neural network systems.

FIG. 18 shows the convergence processes in the initial stages of the iterative calculations achieved in the simulated annealing system ($T(t)=1/\log(t+1)$) and the AMFA system ($T(t)=2/\log(t+1)$), respectively. In this graph, the ordinate and the abscissa respectively designate the value $-E/N$ obtained by normalizing the energy by the number of neurons and the iteration count. When compared with a polygonal line 1802 related to the SA neural network system, a polygonal line 1801 associated with the AMFA neural network system has a very high converging speed. When ten iterative calculations (calculation time=0.2 sec) are conducted in the AMFA system, the energy state (point 1803) is equivalent to that developed by 10,000 iterative calculations (calculation time=198 sec) in the SA system. Namely, the iteration count of the SA system is about 1000 times that of the AMFA system, namely, the AMFA system develops quite a high computation speed.

Next, in order to investigate the difference in the internal state of the neurons in the converged network, as a reference of the distribution of internal states of neurons, there is adopted a concept of a normalized hamming distance defined as follows.

$$-H/N = \sum_{i=1}^{N} |X_i - Y_i|/2N \quad (8)$$

Figure 19A:
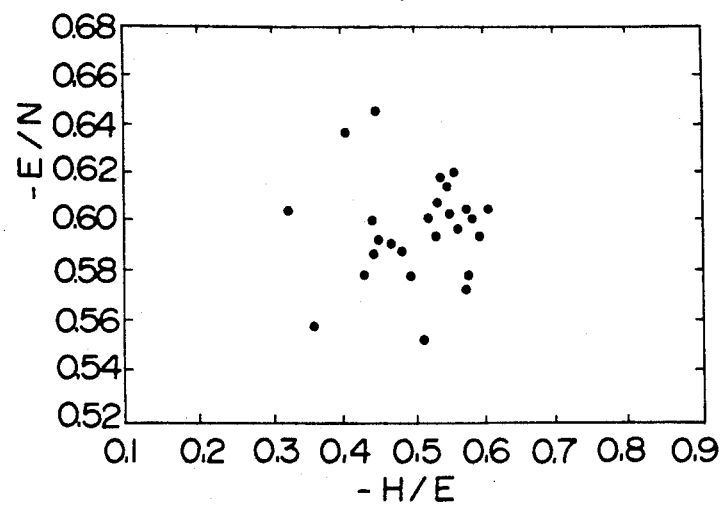
FIGS. 19A to 19C ar diagrams respectively showing relationships between energy states at a convergence and hamming distances in the SA, AMFA, and hybrid neural network systems.
Figure 19B:
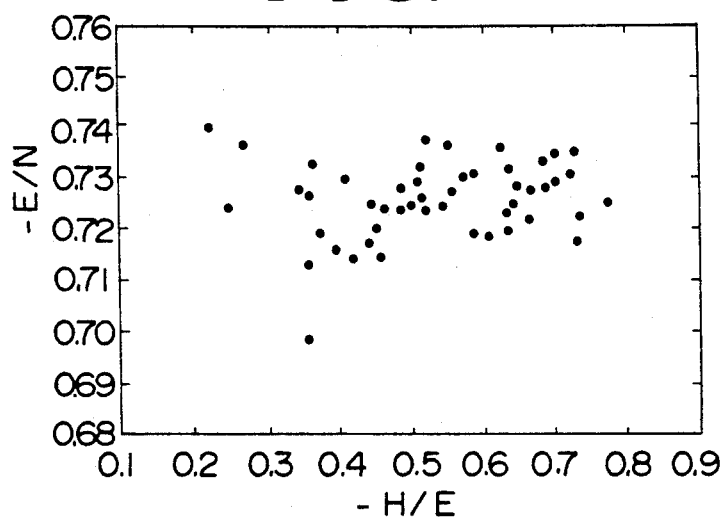
Figure 19C:
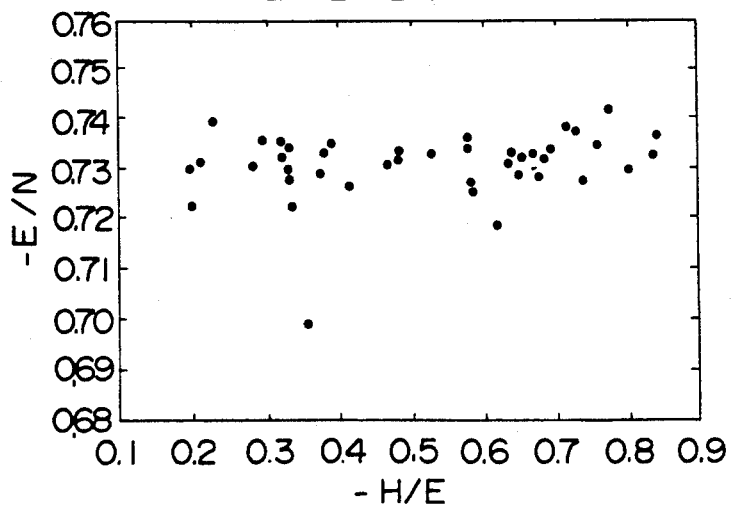

FIG. 19 shows relationships between the normalized hamming distance $-H/N$ (abscissa) and the normalized energy $-E/N$ (ordinate). A state distribution of neurons in the network first converged in each cooling schedule is selected as a reference and the normalized hamming distance is computed based on the distribution. FIGS. 19A, 19B, and 19C respectively show computation results obtained in the SA system ($T(t)=1/\log(t+1)$, iteration count 10,000), the AMFA system ($T(t)=2/\log(t+1)$, iteration count 5000), and the hybrid system (AMFA: $T(t)=1/\log(t+1)$, iteration count 5000; SA: $1/t$, iteration count 1000). For initial state distributions, 25 and 50 kinds of normal random numbers are employed in the SA system and the AMFA and hybrid systems, respectively.

As can be seen from FIGS. 19A to 19C, for the energy values at similar levels, there exist several different states of the normalized hamming distance. This indicates complexity of the local minima found in the spin glass system. Standard deviations of the normalized hamming distance in the respective cooling schedules are 0.1169, 0.1584, and 0.1974 in the SA, AMFA, and hybrid systems, respectively. The reason why the deviation of the AMFA system is larger than that of the SA system will be as follows. In the SA system, even when different initial state distributions are adopted, the energy approaches a similar state, i.e., the value thereof is altered toward the optimal solution by virtue of the fluctuation effect; whereas, in the AMFA system, the distribution of solutions are decided according to the initial state distribution in a manner associated with the decision theory. Moreover, in the hybrid system, the internal states considerably deviated as a result of the AMFA system are employed as the initial states for the SA system to be executed; consequently, as converse to a case where only the SA system is executed, the standard deviation is increased due to the fluctuation. In consequence, considering a case where the neural system is applied to an associative memory, when many local minima exist for similar energy levels, since a large amount of information can be stored without so many interferences, the AMFA system is quite effective as compared with the SA system; moreover, the hybrid system is quite efficient when compared with the AMFA system.

Figure 20A:
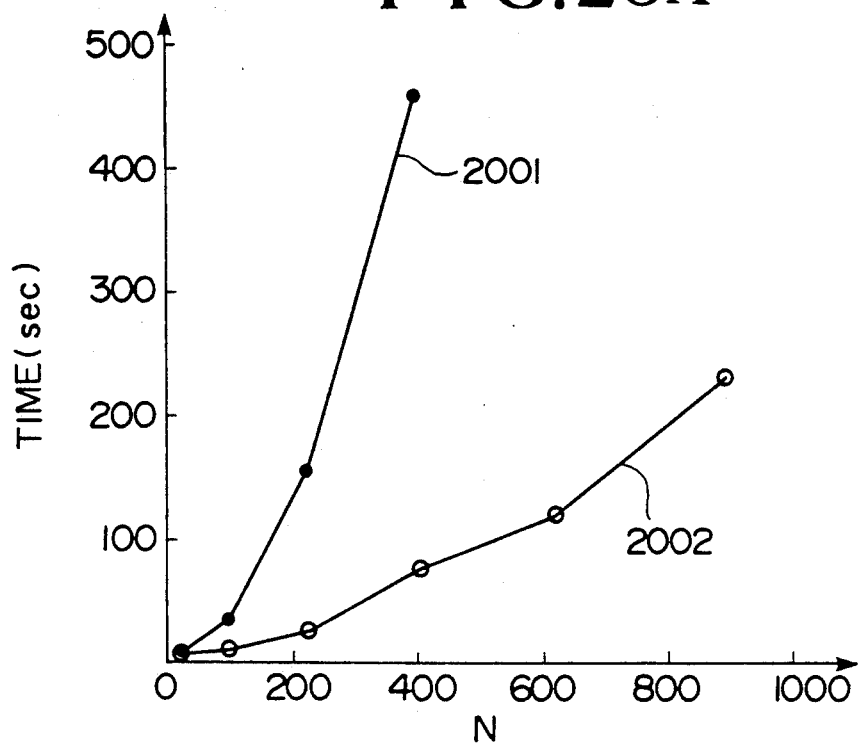
FIGS. 20A and 20B are graphs respectively showing relationships between the number of neurons and the computation time when the scalar and vector operations are achieved in the SA and AMFA neural network systems.
Figure 20B:
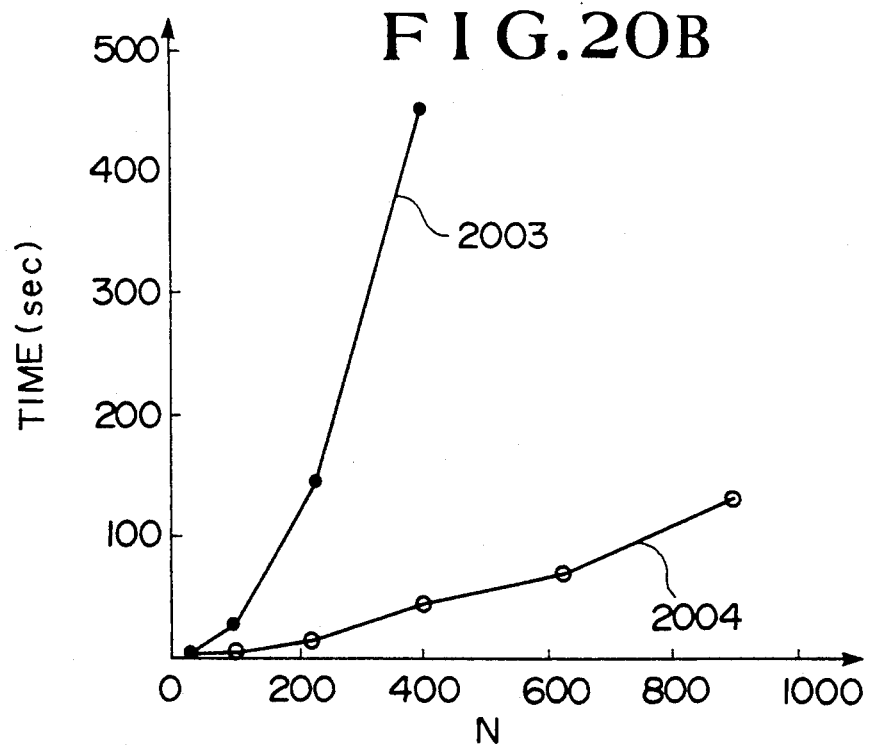

Finally, the computation periods of time for scalar and vector operations are compared between the SA system ($T(t)=1/\log(t+1)$) and the AMFA system ($T(t)=2/\log(t+1)$) while changing the number of neurons. Computation results are shown in FIGS. 20A and 20B in which the ordinate and the abscissa respectively stand for the computation time and the number N of neurons. The number of iterative calculations is set to 5000 in both systems. Comparing a polygonal line 2001 of FIG. 20A with a polygonal line 2003 of FIG. 20B, each resultant from the scalar operations, it has been found that the computation periods of time of the respective systems are substantially identical to each other. Moreover, comparing a polygonal line 2002 of FIG. 20A with a polygonal line 2004 of FIG. 20B, each resultant from the vector operations, it is appreciated that the operation speed is increased in both cases in comparison with the results of the scalar operations. Particularly, the computation time of the AMFA system is about half that of the SA system and hence it can be considered that the vectorization is more efficient therein.

Consequently, it has been confirmed that the AMFA system is superior to the SA system because the AMFA system develops, when compared with the SA system, substantially an identical computation time of the scalar operation and has a higher increase rate in the computation speed in the vector operation to develop a lower energy state.

Next, a description will be given of an application of a problem in which an optimal solution is determined with constraints to a neural network system. As such a problem, e.g., a combinational optimization problem in which the objective function can be represented in a quadratic form, a securities portfolio problem can be chosen. The portfolio problem is an optimization problem to select a combination of stock names for which the maximum profit is attained at the lowest risk. When solving this problem, if a method in which each stock name is checked against the constraints the quantity of calculations will explode. To overcome this difficulty, selection and non-selection of a stock name can be respectively associated with an excitement and an inhibition of each of the neurons interconnected to each other so that the network of the neurons is operated to minimize an appropriate energy function, thereby deciding an optimal combination of stock names.

A specific formulation will be accomplished according to Markowitz of reference 7. First assume that stock prices $P_i(t)$ are given in advance. In this representation, the stock names and points of time take values as $i=1, \ldots, N$ and $t=1, \ldots, T$, respectively. A coefficient of variation is here defined as follows.

$$r_i(t) = \{p_i(t+1) - p_i(t)\}/p_i(t) \tag{9}$$

Using a mean value and a covariance of the coefficient of variation $r_i(t)$, the profit and the risk can be respectively defined as follows.

$$\text{Mean value: } \mu_i = \sum_{t=1}^{T-1} r_i(t)/T - 1) \tag{10}$$

$$\text{Covariance } \sigma_{ij} = \sum_{t=1}^{T-1} \{r_i(t) - \mu_i\} \cdot \{r_j(t) - \mu_j\}/(T - 1) \tag{11}$$

Moreover, as the constraints, the number of stock names to be selected is limited to n.

$$\sum_{i=1}^{N} X_i = n \tag{12}$$

Taking the profit, the risk, and the stock names to be selected into consideration, the energy of the objective function is expressed as $$\text{Energy} = A \sum_{i=1}^{N} \sum_{j=1}^{N} \sigma_{ij} X_i X_j - B \sum_{i=1}^{N} \mu_i X_i +$$

$$C \left( \sum_{i=1}^{N} X_i - n \right)^2 = \sum_{i=1}^{N} \sum_{j=1}^{N} (A\sigma_{ij} + C) X_i X_j - \tag{13}$$

$$\sum_{i=1}^{N} (B\mu_i + 2Cn) X_i + Cn^2$$

where, $X_i \{0, 1\}$ and A, B, and C are constants. In the equation (13), since $Cn^2$ does not depend on $\{X_i\}$, $$E(\{X_i\}) = \sum_{i=1}^{N} \sum_{j=1}^{N} (A\sigma_{ij} + C) X_i X_j - \sum_{i=1}^{N} (B\mu_i + 2Cn) X_i \tag{14}$$

is rendered. From the correspondence between the equation (14) and the energy function of a network of an interconnecting type, i.e., $$E(\{X_i\}) = -(1/2) \sum_{i=1}^{N} \sum_{j=1}^{N} w_{ij} X_i X_j + \sum_{i=1}^{N} a_i X_i \tag{15}$$

the following equations are obtained.

$$w_{ij} = -2(A\sigma_{ij} + C) \tag{16}$$

$$a_i = -(B\mu_i + 2Cn)$$

As well known, when the diagonal elements of a matrix for coupling weights of a network, namely, a self-feedback thereof is zero, i.e., $w_{ii}=0$, the states of neurons do not take intermediate active values, namely, the internal states are likely to be classified into binary values. Moreover, it has been known that there is made rapid and stable convergence. However, in the portfolio problem, the diagonal elements of the matrix for the coupling weights are not generally zero. To overcome this difficult situation, based on a characteristic that $X_i X_i = X_i (i=1, \ldots, N)$ when the internal state allowed for the neuron is $\{0, 1\}$, the expression (15) of the energy function is transformed as follows to convert the self-feedback elements to zero.

$$\therefore E(\{X_i\}) = -(1/2) \sum_{i=1}^{N} \sum_{j=1}^{N} \omega_{ij} X_i X_j + \sum_{i=1}^{N} (a_i - w_{ii}/2) X_i \tag{17}$$

where, $$\omega_{ij} = \begin{cases} w_{ij} & (i \neq j) \\ 0 & (i = j) \end{cases} \tag{18}$$

Here, the value of the equation (17) of the energy function is computed by the controller 102.

Table 3 shows results of computations executed for stock data of 50 stock names based on the equation (17) of the energy function in the SA neural network system ($T(t) = 1/\log(t+1)$) with the iteration count set to 5000. As the computation constraints, $A=1$ and $C=5$ are set and the number of stock names is set to be 5.

TABLE 3

| B | Risk | Profit | Stock name number |
|---|------|--------|-------------------|
| 10 | 23.8 | 2.24 | 3 13 32 43 49 |
| 20 | 28.1 | 2.69 | 3 13 25 43 49 |
| 30 | 55.9 | 4.09 | 4 6 15 43 49 |

On the other hand, when combinations of five stock names are selected 10,000 times at random, the means value of the risk is 54.5 (standard deviation=17.0) and the mean value of the profit is 1.86 (standard deviation=0.67). Consequently, the results of Table 3 indicate that there are selected combinations of stock names for the large profit with a reduced risk.

FIG. 21 shows the asymptotic characteristic when the computation processing is executed with the iteration count set to 100,000. The ordinate and the abscissa respectively designate a value $-E/N$ attained by normalizing the energy by the number of neurons and $1/t^{0.5}$. In the portfolio problem, the upper limit value of the energy is considered to form an asymptotic characteristic line 2101. Estimating the optimal solution from this asymptotic characteristic, the result is attained as $-E/N \div 1.473$. With the iteration count set to 500, the energy is developed as $-E/N=2.472$ and hence can be considered to have substantially reached the optimal solution.

In the AMFA neural network system, assume that the internal state of each neuron is represented in the format of $\{-1, 1\}$56. Assigning to the equation (14) the following relation between the neuron $X_i$ in the $\{0, 1\}$ format and the neuron $V_i$ in the $\{-1, 1\}$ format, $$X_i = (V_i + 1)/2 \tag{19}$$

the energy is attained as $$\text{Energy} = \sum_{i=1}^{N} \sum_{j=1}^{N} (A\sigma_{ij} + C)X_iX_j - \sum_{i=1}^{N} (Ba_i + 2Cn)X_i = \tag{20}$$

$$\sum_{i=1}^{N} \sum_{j=1}^{N} \{(A\sigma_{ij} + C)/4\}V_iV_j +$$

$$\sum_{i=1}^{N} \left( \sum_{j=1}^{N} (A\sigma_{ij} + C)/2 - (Ba_i + 2Cn)/2 \right) V_i +$$

$$\sum_{i=1}^{N} \sum_{j=1}^{N} (A\sigma_{ij} + C)/4 - \sum_{i=1}^{N} (Ba_i + 2Cn)/2$$

In the equation (20), the third and fourth terms are constant terms and hence can be omitted. Establishing a correspondence between the equation (20) and the equation (15) of the energy function of the network of an interconnecting type, $$\left. \begin{array}{l} w_{ij} = -(A\sigma_{ij} + C)/2 \\ \\ a_i = \left\{ \sum_{j=1}^{N} (A\sigma_{ij} + C) - (Ba_i + 2Cn) \right\}/2 \end{array} \right\} \tag{21}$$

are satisfied.

To set the self-feedback elements to zero, the equation (15) of the energy function need only to be transformed as follows, based on a characteristic of $X_iX_i=1$ ($i=1, \ldots, N$).

$$E(\{X_i\}) = -(1/2) \sum_{i=1}^{N} \sum_{j=1}^{N} \omega_{ij}X_iX_j + \sum_{i=1}^{N} a_iX_i \tag{22}$$

where, $$\omega_{ij} = \begin{bmatrix} w_{ij} & (i \neq j) \\ 0 & (i = j) \end{bmatrix} \tag{23}$$

and the constant term $$\sum_{i=1}^{N} (-w_{ii}/2)$$

is omitted.

In a case where the range of output from the neuron is $\{0, 1\}$, the threshold value is modified; whereas, when the range is $\{-1, 1\}$, the threshold value is not modified. The threshold value is produced from the generator 109 according to a result of a problem analysis achieved by the controller 102.

Table 4 shows results of execution of the computation conducted on stock data related to 50 stock names in the AMFA system $(T(t)=10/t)$ based on the energy function represented by the equation (22) with the iteration count set to 100. The computation constraints are set, like in the case of the SA system, as $A=1$, $C=5$, and $n=5$.

TABLE 4

| B  | Risk | Profit | Stock name number |
|----|------|--------|-------------------|
| 10 | 24.9 | 2.75   | 2 3 13 43 49      |
| 20 | 35.0 | 3.21   | 2 9 13 43 49      |
| 30 | 56.7 | 4.08   | 4 9 12 15 49      | when $T(t)=T_0/\log(t+1)$ is adopted as the cooling schedule, the energy state cannot be stabilized and hence a satisfactory convergence cannot be obtained with the iteration count set to 500 or less. One of the reasons may be considered as follows. For the portfolio problem, the network has a characteristic to reach the global minimum at a relatively high speed; consequently, as compared therewith, the cooling speed of $T(t)=T_0\log(t+1)$ is to slow. Adopting a cooling schedule $T(t)=10/t$ in place of that used above, there is obtained a substantially complete convergence of the energy state with 100 iterative calculations.

When compared with the mean value of the risk 54.5 (standard deviation 17.0) and the mean value of the profit 1.86 (standard deviation 0.67) attained when combinations of stocks of five stock names are selected 10,000 times at random, there are selected, as shown in Table 4, combinations of stock names yielding a large profit with a small risk, similar to that of the SA system. Moreover, the combinations thus selected include several stock names having the same stock numbers as those obtained in the SA system.

In a method in which the constraint of the number of stock names is incorporated in the form of an addition as shown in equation (13), the constraint cannot be necessarily satisfied. As a result of experiments, depending on variations in the parameter values, there frequently appear solutions in which the number of actually selected stock names is more than or is less than that specified as the constraint. To always obtain feasible solutions satisfying equation (12) of the constraint associated with the number of stock names to be selected, the output function for determining the output signal from each neuron is changed from the sigmoid function to the following functions.

$$X_1 = n \cos^2 \theta_1 \tag{24}$$

$$X_i = \left(n - \sum_{j=1}^{i-1} X_j \right) \cos^2 \theta_i$$

$$X_N = n - \sum_{j=1}^{N-1} X_j$$

where, $\theta_i$ is a variable. When the output function is represented by equation (24), equation (12) of the constraint is satisfied in any cases. In the following paragraphs, neural network including neurons having the output functions represented by the equation (24) is to be called a neural network of a constraint embedded type.

Description has been given of a case where the optimization in a neuro computing is regarded as a 0-1 problem to attain a solution. However, in the securities portfolio problem, a practical problem is not only the selection of stock names but also the decision of the distribution ratios between the stock quantities of the selected stock names. In the SA system of the constraint embedded type, owing to us of the equation (24) for the states of the neurons to be transformed, an intermediate value between 0 and 1 is allowed as the output state of each neuron. Therefore, by setting n to one (n=1), the problem can be solved to attain the distribution ratios.

Table 5 shows five upper-most stock names resultant from an experiment in which the distribution ratios of the stocks are obtained, for stock data related to 50 stock names, in the SA system of the constraint embedded type with the cooling schedule $T(t)=T_0$ through 500 iterative computations. As computation constraints, like in the SA system, a is set to 1 and the coupling weights and threshold values are set when C=0 in equation (16). Moreover, the diagonal elements of the coupling weights are set to zero.

TABLE 5

| B | Stock name number (ratio) |
|---|---|
| 10 | 13(0.32) 6(0.22) 50(0.17) 43(0.14) 3(0.04) |
| 20 | 43(0.27) 13(0.19) 49(0.14) 6(0.15) 50(0.09) |
| 30 | 43(0.32) 15(0.28) 47(0.16) 49(0.08) 13(0.05) |

When the compared with Table 3 resulted from the experiment in the SA system, there are shown common stock names thus selected, namely, it can be considered that the obtained solutions are equivalent to those of Table 3.

Subsequently, solve a 0-1 problem based on an SA system of the constraint embedded type. For this purpose, it is necessary for the output from the neuron to take a binary value {0, 1}; in other words, the output cannot take an intermediate value therebetween. An entropy term is accordingly added to equation (17) of the energy function.

$$E(\{X_i\}) = -(1/2) \sum_{i=1}^{N} \sum_{j=1}^{N} w_{ij}X_iX_j + \sum_{i=1}^{N} (a_i - w_{ii}/2)X_i - \sum_{i=1}^{N} D\{X_i \log X_i + (1 - X_i) \cdot \log(1 - X_i)\} \quad (25)$$

where, D denotes a constant.

Table 6 shows results of computations achieved, for stock data related to 50 stock names, in the SA system of the constraint embedded type based on the equation (25) of the energy function. The number of stock names to be selected and the iteration count are set to 5 and 500, respectively. The other constraints are identical to those adopted in the computation for the ratios. In the computation according to equation (25), a satisfactory convergence is not obtained. Consequently, to uniformly excite the neurons in the initial stage of the iterative calculations, the computation process is modified such that D is set to −5 according to the constraints to achieve the first 125 iterative calculations; thereafter, D is set to 5 so as to improve the characteristic of convergence.

TABLE 6

| B | Risk | Profit | Stock name number |
|---|------|--------|-------------------|
| 10 | 32.4 | 2.11 | 2 3 6 9 12 |

TABLE 6-continued

| B | Risk | Profit | Stock name number |
|---|------|--------|-------------------|
| 20 | 48.4 | 3.03 | 2 6 9 12 43 |
| 30 | 55.1 | 3.43 | 13 15 43 47 49 |

As compared Table 6 with Table 5 resultant from the solution associated with the distribution ratios, some stock names are shared therebetween; furthermore, in Table 6, there does not exist a combination of stock names which are extremely different from those of Table 5. Moreover, from comparison with the mean value of the risk 54.5 (standard deviation 17.0) and the mean value of the profit 1.86 (standard deviation 0.67) obtained when combinations of five stock names are selected 10,000 times at random, it can be considered that there are selected combinations of stock names for a large profit with a reduced risk. When compared with the risks and the profits of Tables 3 and 4 respectively resulted from computations in the SA and AMFA systems, the quality of the solutions are slightly deteriorated; however, the solutions satisfy the constraints in any cases.

Since the number of stock names to be examined is relatively small, i.e., 50, and hence the covergence is achieved at a high speed, the difference of the computation speed is not clearly recognized between the SA and AMFA systems. However, in a case where the network size is increased or where the problem has many local minima, it can be inferred therefrom that the high-speed AMFA system will give a satisfactory efficiency.

As a result, combining a method in which constraints related to the number of stock names to be selected are automatically satisfied, with the AMFA method, it can be considered that the resultant method is most suitable as a method in which high-quality solutions are obtained at a high speed.

While particular embodiments of the invention have been shown and described, it will be obvious to those skilled in the art that various changes and modifications may be made without departing from the present invention in its broader aspects.

I claim:

1. A neural network system comprising:
   output means for outputting data supplied thereto;
   network group means including first and second neural network means, wherein said first neural network means operates in accordance with a mean field approximation method to which annealing is added, said second neural network system operates in accordance with on a simulated annealing method, each of said first and second neural network means includes a plurality of neurons, and each of the neurons is connected to neurons via synapses for weighting outputs from the neurons depending on synapse weights and computes an output for a total of the weighted outputs from the neurons in accordance with its output function;
   parameter setting means responsive to a parameter setting instruction, for generating for the plurality of neurons neuron parameters including synapse weights, threshold values, and an output function, setting the generated neuron parameters to said first neural network means, and selectively setting the generated neuron parameters to said second neural network means; and
   operation control means responsive to an input of a problem, for analyzing the problem, for generating the parameter setting instruction in accordance with the analyzing result to output the instruction to said parameter setting means, for controlling, after said parameter setting means sets the neuron parameter an operation of said first neural network means in accordance with the analyzing result, for selectively outputting in accordance with the analyzing result, a result of the operation of said first neural network means to one of said output means and said second neural network means, for controlling an operation of said second neural network means in accordance with the analyzing result and the operation result of said first neural network means, and for outputting the operating result of the second neural network means to said output means.

2. A neural network system according to claim 1, wherein said parameter setting means includes means responsive to the parameter setting instruction, for generating as the output function of each neuron in said first neural network means an output function including one of a temperature parameter gradually decreasing in association with an increase in the number of iterative calculations and a temperature parameter being fixed with respect to the number of iterative calculations.

3. A neural network system according to claim 1, wherein said parameter setting means includes means responsive to the parameter setting instruction, for generating as the gradually decreasing temperature parameter a temperature parameter gradually decreasing in accordance with a reciprocal of a power of the number of iterative calculations.

4. A neural network system according to claim 1, wherein said operation control means includes means for setting as an initial internal state of each neuron in said first neural network means one of a normal random number and a uniform random number in accordance with the analyzing result.

5. A neural network system according to claim 1, wherein said operation control means includes means for determining an end of the operation of each of said first and second neural network means in accordance with a predetermined end condition, the predetermined end condition including at least one of conditions that an energy difference in said first or second neural network means before and after an iterative calculation is less than a first predetermined value, that a change in an output state of each neuron in said first or second neural network means before and after the iterative calculation is less than a second predetermined value, and that a predetermined number of iterative calculations have been executed.

6. A neural network system according to claim 1, wherein said operation control means includes means for setting, when the problem is analyzed to be a problem with constraints, a synapse weight of a self-feedback to zero and changing a threshold value for each of the neurons.

7. A neural network system according to claim 1, wherein said operation control means includes means for adding, when the problem is analyzed to be a problem with constraints, an entropy term to an objective function such that an output from each of the neurons converges to a discrete value.

8. A neural network system according to claim 7, wherein said operation control means includes means for adding to the objective function the entropy term with a first sign at an initial stage of the iterative calculations to slightly excite all of the neurons in a uniform manner and adding to the objective function the entropy term with a second sign opposed to the first sign after an end of the initial stage of the iterative calculations.

9. A neural network system according to claim 1, wherein said operation control means includes means responsive to an end of the operation of said first neural network means, for setting a temperature equal to or higher than a temperature related to the temperature parameter of said first neural network means as an initial temperature of said second neural network means.

10. A neural network system according to claim 1, wherein said operation control means includes means for generating as a temperature parameter of said second neural network means a temperature parameter gradually decreasing in accordance with an increase in the number of iterative calculations.

11. A neural network system according to claim 10, wherein said operation control means includes means for generating as the gradually decreasing temperature parameter one of a temperature parameter gradually decreasing in accordance with a reciprocal of a power of the number of iterative calculations and a temperature parameter gradually decreasing in accordance with a reciprocal of a logarithm of the number of iterative calculations.

12. A neural network system according to claim 10, wherein said operation control means includes means for generating as the gradually decreasing temperature parameter a temperature parameter gradually decreasing in accordance with a result of a processing of the number of iterative calculations.

13. A neural network system comprising:
output means for outputting data supplied thereto;
neural network means operable in accordance with an annealing-added mean field approximation (AMFA) method in a first mode or a simulated annealing (SA) method in a second mode, wherein said neural network means includes a plurality of neurons, and each of the neurons is connected to the neurons via synapses for weighting outputs from the neurons depending on synapse weights and computes an output for a total of the weighted outputs from the neurons in accordance with its output function;
parameter setting means responsive to a parameter setting instruction, for generating for the plurality of neurons neuron parameters including synapse weights, threshold values, and an output function, setting the generated neuron parameters to said neural network means; and
operation control means responsive to an input of a problem, for analyzing the problem, for setting the first mode, for generating the parameter setting instruction in accordance with the analyzing result to output the instruction to said parameter setting means, for controlling, after said parameter setting means sets the neuron parameters, said neural network means to operate in the first mode in accordance with the analyzing result, for outputting in accordance with the analyzing result, a result of the operation of said neural network means to said output means, for setting the second mode, for outputting the parameter setting instruction to said parameter setting means in accordance with the analyzing result and the operation result in the first mode, for controlling, after said parameter setting means sets the neuron parameters, said neural network means to operate in the second mode in accordance with the analyzing result and the operation result in the first mode, and for outputting the operation result of said neural network means to said output means.

14. A neural network system according to claim 13, wherein said parameter setting means includes means for generating, in response to the parameter setting instruction, as an output function of each neuron of said neural network means in the first mode, the output function including a temperature parameter gradually decreasing in accordance with an increase in the number of iterative calculations or a temperature parameter being fixed with respect to the number of iterative calculations.

15. A neural network system according to claim 14, wherein said parameter setting means includes means for generating, in response to the parameter setting instruction, as the gradually decreasing temperature parameter a temperature parameter gradually decreasing in accordance with a reciprocal of a power of the number of iterative calculations.

16. A neural network system according to claim 15, wherein said operation control means includes
means for generating, in response to the analyzing result, normal random numbers or uniform random numbers as an initial internal state of the neurons in said neural network means.

17. A neural network system according to claim 13, wherein said operation control means includes means for determining in accordance with a predetermined end condition whether processing based on the AMFA method is completed, the predetermined end condition including a least one of the conditions that an energy difference in said neural network means before and after an iterative calculation is less than a first predetermined value, that a change in an output state of each neuron in said neural network means before and after an iterative calculation is less than a second predetermined value, and that a predetermined number of iterative calculations have been executed.

18. A neural network system according to claim 13, wherein said operation control means includes means for setting, when the problem is analyzed to be a problem with constraints, a synapse weight of a self-feedback to zero and changing a threshold value for each of the neurons.

19. A neural network system according to claim 13, wherein said operation control means includes means for adding an entropy term to an objective function when the problem is analyzed to be a problem with constraints, such that the output from each of the neurons converges to a discrete value.

20. A neural network system according to claim 19, wherein said operation control means includes means for adding to the objective function the entropy term with one of plus and minus at an initial stage of the iterative calculation to slightly excite all of the neurons in a uniform manner and adding to the objective function the entropy term with the other after the initial stage of the iterative calculations.

21. A neural network system according to claim 20, wherein said operation control means includes means for generating as the gradually decreasing temperature parameter a temperature parameter gradually decreasing in accordance with a result of a multiplication or an addition on the number of iterative calculations.

22. A neural network system according to claim 13, wherein said operation control means further comprises:
controlling, after the setting of the neuron parameters, said neural network to operate in the second mode while applying a fluctuation to each of the neurons, the fluctuation gradually lowering the temperature in accordance with a cooling schedule, and to determine a state of each neuron such that energy of said neural network means takes a minimum value in the second mode.

23. A neural network system according to claim 22, wherein said operation control means includes means for setting, at an end of the operation in the firs mode, a temperature equal to or higher than a temperature related to the temperature parameter of the operation in the first mode as an initial temperature of the operation in the second mode.

24. A neural network system according to claim 22, wherein said operation control means includes means for generating as the temperature parameter of the operation in the second mode a temperature parameter gradually decreasing in accordance with an increase in the number of iterative calculations.

25. A neural network system according to claim 24, wherein said operation control means includes means for generating as tie gradually decreasing temperature parameter a temperature parameter gradually decreasing in association with a reciprocal of a power of the number of iterative calculations or a temperature parameter gradually decreasing in accordance with a reciprocal of a logarithm of the number of iterative calculations.

* * * * *